(12) United States Patent
Chang

(10) Patent No.: US 7,476,987 B2
(45) Date of Patent: Jan. 13, 2009

(54) STAND-ALONE WIND TURBINE SYSTEM, APPARATUS, AND METHOD SUITABLE FOR OPERATING THE SAME

(75) Inventor: Liuchen Chang, Fredericton (CA)

(73) Assignee: The University of New Brunswick (CA)

(*) Notice: Subject to any disclaimer, the term of this patent is extended or adjusted under 35 U.S.C. 154(b) by 202 days.

(21) Appl. No.: 11/410,732

(22) Filed: Apr. 25, 2006

(65) Prior Publication Data

US 2007/0246943 A1 Oct. 25, 2007

(51) Int. Cl.
F03D 9/00 (2006.01)
H02P 9/04 (2006.01)

(52) U.S. Cl. .............................. 290/55; 290/44; 322/28
(58) Field of Classification Search .................. 290/44, 290/55; 416/132 B; 322/28; 415/7; 323/201; 363/95, 98, 108, 109
See application file for complete search history.

(56) References Cited

U.S. PATENT DOCUMENTS

| | | | |
|---|---|---|---|
| 6,566,764 B2* | 5/2003 | Rebsdorf et al. | 290/44 |
| 7,015,595 B2* | 3/2006 | Feddersen et al. | 290/44 |
| 7,291,937 B2* | 11/2007 | Willisch et al. | 290/44 |
| 7,391,126 B2* | 6/2008 | Liu et al. | 290/44 |
| 2002/0159280 A1* | 10/2002 | Zhu et al. | 363/98 |
| 2007/0013194 A1* | 1/2007 | Calley | 290/44 |
| 2007/0029802 A1* | 2/2007 | Moehlenkamp | 290/44 |

OTHER PUBLICATIONS

Rashid, MH; Power Electronics—Circuit, Devices, and Applications, 2nd ed., Prentice Hall, 1993, Only cover sheet of book given.

Erickson, RW & Maksimovic, D; Fundamentals of Power Electronics, 2nd. ed., Boston: Kluwer Academic Publishers, 2001.

Pierik, JTG; Aug. 2001; Performance Evaluation Methods for Autonomous, Applications Oriented Wind Turbine Systems [online]. http://www.ecn.nl/wind/index.nl.html.

Huang, H. & Chang, L. "Energy-flow direction control of grid-connected IGBT inverters for wind energy extraction." Proc. IEEE Elect. Comput. Eng. Can. Conf. (CCECE '00), Mar. 7-10, 2000, vol. 1, pp. 535-539.

(Continued)

*Primary Examiner*—Julio C. Gonzalez
(74) *Attorney, Agent, or Firm*—Krieg DeVault LLP

(57) ABSTRACT

This invention provides a wind turbine-battery-dump load stand-alone renewable energy system and an optimal control of the same. The system may include both power conversion and control units. In one embodiment, the power conversion unit features a wind-turbine-driven three-phase induction generator, a diode rectifier, a battery charger, a boost dc/dc converter, a battery bank (48V), and a dc/ac inverter. A dump load is also used to dissipate excess power that is not required for either the battery charging or for the load. The integrated control unit may use the TMS320LF2407A DSP microcontroller from Texas Instruments, which allows operations of the wind power system and the battery storage system to be merged into a single package under a master controller. An embodiment of the control system features battery-charging control, battery voltage-boost control, dump load control, PWM inverter control, and system protection. It enables the use of renewable energy resources, while at the same time facilitating an efficient management of energy dispatch. This integrated control system offers remote villages the potential to fully supply their electrical power needs.

17 Claims, 27 Drawing Sheets

OTHER PUBLICATIONS

Kuikman, J.; 1999. Instructions for assembly of the Fortis Montana 4000 [online]. http://www.fortiswindenergy.com.

Lai, C-H & Tzou, Y-Y; "DSP-Embedded UPS Controller for High-Performance Single-Phase On-Line UPS Systems." 2002 IEEE 28th Annual Conf. Ind. Electronic Society, No. 5-8, 2002, vol. 1, pp. 268-273.

Lyn, CE, Rahim, NA & Mekhilef, S; "DSP-based Fuzzy Logic Controller for a Battery Charger." Proc. TENCON '02, Oct. 28-31, 2002, vol. 3, pp. 1512-1515.

Duryea, S, Islam, S. & Lawrance, W. "A Battery Management System for Stand-Alone Photovoltaic Energy Systems." IEEE Ind. Appl. Mag., vol. 4, pp. 67-72, Oct. 3-7, 2001.

Hua, C-C & Lin, M-Y; "A Study of Charging Control of Lead-Acid Battery for Electric Vehicles." Proc. IEEE Int. Symp. on Ind. Electronics, Dec. 4-8, 2000, vol. 1, pp. 135-140.

West, S & Krein, PT. "Equalization of Valve-Regulated Lead-Acid Batteries: Issues and Life Test Results." 22nd International Telecommunications Energy Conf. Sep. 10-14, 2000, pp. 439-446.

Maskey, M, Parten, M, Vines, D, & Maxwell, t. "An Intelligent Battery Management Systemf or Electric and Hybrid Electric Vehicles." IEEE 49th Vehicular Technology Conference. May 16-20, 1999, vol. 2, pp. 1389-1391.

Barsali, S. & Ceraolo, M. "Dynamical Models of Lead-Acid Batteries: Implementation Issues." IEEE Trans. Energy Conversion, vol. 17, pp. 16-23, Mar. 2002.

Nehrir, MH, LaMeres, BJ, Venkataramanan, G, Gerez, V & Alvarado, LA. "Performance Evaluation of Stand-Alone Wind/Photovoltaic Generating Systems." IEEE Power Engineering Society Summer Meeting, Jul. 18-22, 1999, vol. 1, pp. 555-559.

Salameh, ZM, Casacca MA & Lynch, WA. "A Methematical Model for Lead-Acid Batteries." IEEE Trans. Energy Conversion, vol. 7, pp. 93-98, Mar. 1992.

Zhan, C-J, Wu, XG, Kromlidis, W, Ramachandaramurthy, VK, Barnes, M, Jenkins, N & Ruddell, AJ. "Two Electrical Models of the Lead-Acid Battery Used in a Dynamic Voltage Restorer." IEE Proc.—Generation, Transmission and Distribution, vol. 150, pp. 175-182, Mar. 2003.

Cai, C, Du, D, Ge, J, Liu A & Zhang, H. "Battery-Charging Model to Study Transient Dynamics of Battery at High Frequency." IEEE Region 10 Conf. on Computers, Communications, Control and Power Engineering, Oct. 28-31, 2002, vol. 3, pp. 1843-1846.

Borowy, BS and Salameh, ZM. "Dynamic Response of a Stand-Alone Wind Energy Conversion System with Battery Energy Storage to a Wind Gust." IEEE Trans. Energy Conversion, vol. 12, pp. 73-78, Mar. 1997.

Boutot, T & Chang, L. "Development of a Single-Phase Inverter for Small Wind Turbines." Proc. IEEE Elect. Comput. Eng. Can. Conf., May 24-28, 1998, vol. 1, pp. 305-308.

Zheng, Q, Wang, Q, Hao, R & Chang, L. "A Novel Three-Phase Pulse Width Modulation (PWM) Technique Based on Co-related References." Third International Conf. on Telecommunications Energy Special, May 7-10, 2000, pp. 255-258.

Wang Q and Chang L. "PWM Control Strategies for Wind Turbine Inverters." Proc. IEEE Elect. Comput. Eng. Can. Conf., May 24-28, 1998, vol. 1, pp. 309-312.

Boutot, T, Chang L. & Luke, D. "A Low Speed Flywheel System for Wind Energy Conversion," Proc. IEEE Elect. Comput. Eng. Can. Conf. (CCECE '02), May 24-28, 202, vol. 1, pp. 251.

Bartoli, M, Reatti, A & Kazimierczuk, MK. "Minimum Copper and Core Losses Power Inductor Design." IEEE Ind. Appl. Conf., 31st IAS Ann. Mtg, Oct. 6-10, 1996, vol. 3, p. 1369-76.

Zahran, M., Dmowski, A., Kras, B., Biczel, P. & Drazkiewicz, J. "PV Battery Wind-Turbine Public-Grid Hybrid Power Supply for Telecom.-Equipment, System Management and Control." 35th Intersociety Energy Conversion Engineering Conf. and Exhibit, Jul. 24-28, 2000, vol. 2, pp. 1252-1260.

Bulletin 501. "A Sulfated Battery." Surrette Battery Company Limited, Springhill, Nova Scotia, no date provided.

Bulletin 605. "Preventive Maintenance, Chargin and Equalization." Surrette Battery Company Limited, Springhill, Nova Scotia, no date provided.

Bulletin 606. "Measuring Specific Gravity." Surrette Battery Company Limited, Springhill, Nova Scotia, no date provided.

Bulletin 607. "Basic Lead Acid Battery Safety Principals." Surrette Battery Company Limited, Springhill, Nova Scotia, no date provided.

Bulletin 609. "Voltages, Specific Gravity and State of Charge." Surrette Battery Company Limited, Springhill, Nova Scotia, no date provided.

Bulletin 611. "The Positive Power Choice." Surrette Battery Company Limited, Springhill, Nova Scotia, no date provided.

Simon, E. "Implementation of a speed field oriented control of 3-phase PMSM motor using TMS320F240." Texas Instruments, Dallas, TX, spra588.pdf., Sep. 1999.

"TMS320LF/C24x DSP controller reference guide, CPU and isntruction set," spru160c.pdf, Texas Instruments, Dallas, TX, Jun. 1999.

"TMS320LF/LC240xA DSP controllers reference guide, system and peripherals," spru357b.pdf, Texas Instruments, Dallas, TX, Dec. 2001.

Spectrum Digital Incorporated (2003). "eZdsp TM LF2407A technical reference." [Online]. Available: http://www.spectrumdigital.com/cgi.catalog-cgi?show_products=761119.

Huang, H. & Chang, L. "An error-driven controller for electric vehicle propulsion systems." IEEE Elect. Comput. Eng. Can. Conf. (CCECE 97), May 25-28, 1997, pp. 744-747.

Huang, H. & Chang, L. "Error drive PI control of EV propulsion systems based on induction motors." IEEE 56th Vehicular Tech. Conf. Sep. 24-28, 2002, vol. 3, pp. 1686-1690.

Huang, H. & Chang. L. "The sensitivity analysis of error driven PI control." IEEE Elect. Comput. Eng. Can. Conf. (CCECE 98), May 24-28, 1998, vol. 1, pp. 121-124.

Sharaf, AM, El-Khatib, RA & Abu-Azab, SI. "A flexible gain error driven position controller for DC motor drives." IEEE Int. Conf. Electron., Circuits and Systems, Sep. 5-8, 1999, vol. 2, p. 981-84.

Park, H-S, & Kim, H-J. "Simultaneous control of DC-DC converters by DSP controller." IEEE Int. Conf. Power Electron. & Drive Systs, Oct. 22-25, 2001, vol. 1, p. 89-93.

Gavanidou, ES & Bakirtzis, AG. "Design of a stand alone system with renewable energy sources using trade off methods." IEEE Trans. Energy Conversion, vol. 7, pp. 42-48, Mar. 1992.

Proven Engineering Ltd. (1999, Apt. 15). Application of microcontroller to wind turbine system [Online]. Available: http://www.almac.co.uk/proven/.

Kroposki, B. & Elam, C. (May 25, 2004). Renewable electrolysis integrated system development and testing. [Online]. Available: http://www.nrel.gov/wind/.

Nergaard, TA, Ferrell, JF, Leslie, LG, & Lai, J-S. "Design considerations for a 48 V fuel cell to split single phase inverter system with ultracapacitor energy storage." in Proc. IEEE-PESC/02, Jun. 23-27, 2002, vol. 4, pp. 2007-2012.

Huang, H. & Change, L. "Energy flow principles of IGBT inverters in wind energy conversion systems." in Proc IEEE Elect. Comput. Eng. Can. Conf. (CCECE '00), Mar. 7-10, 2000, vol. 1, pp. 545-549.

Houdhury, S. "Average current mode controller power factor correction converter using TMS320LF2407A." Texas Instruments, Dallas, TX, spra902.pdf, 2003.

* cited by examiner

Bypass Mode

Buck-Boost Mode

Battery-Only Mode

BATTERY CHARGER

STAND-ALONE WIND TURBINE SYSTEM, APPARATUS, AND METHOD SUITABLE FOR OPERATING THE SAME

BACKGROUND

1. Technical Field

This application relates to wind turbine systems and control techniques in general, and to a stand-alone wind turbine system, apparatus, and method suitable for operating the same, in particular.

2. Description of the Related Art

Renewable energy sources including wind power offer a feasible solution to distributed power generation for isolated communities where utility grids are not available. In such cases, stand-alone wind energy systems (i.e., systems not connected to the utility grid) can be considered as an effective way to provide continuous power to electrical loads.

To date, no stand-alone wind energy system is available on the market as an "off-the-shelf" product. Instead, the various components must be combined; each with their own dedicated power electronic components and controllers. Custom assembling of all discrete components offers only a limited scope for improvement or for adding new features. As well, potential problems can arise when trying to coordinate the various components in a way that does not affect reliability of the entire system.

One of the most promising applications of renewable energy generation lies in the development of power supply systems for remote communities that lack an economically feasible means of connecting to the main electrical grid. For isolated settlements located far from a utility grid, one practical approach to self-sufficient power generation involves using a wind turbine with battery storage to create a stand-alone system. If wind conditions are favourable, these stand-alone wind energy systems usually can provide communities with electricity at the lowest cost.

Small, stand-alone systems capable of producing up to a few kilowatts generally use batteries and do not have diesel-engine-driven gensets. In terms of cost per kilowatt-hour, small gensets are more expensive to buy and operate than are larger machines. Batteries therefore tend to be a more cost-effective energy storage solution for small systems. Wind and photovoltaics are often combined, because they complement each other on both a daily and seasonal basis. The wind usually blows when the sun does not shine, and vice versa.

Of particular interest are small-scale wind-battery integrated systems. Prior art configurations for wind energy systems have evolved from the configurations of several pre-existing commercial and prototype wind turbine systems. Differences in system topology and operation of these prior-art systems are summarized below.

The simplest configuration, shown in FIG. 1, is used in a domestic electrical heating system supplied by Proven Engineering Products Ltd. in the United Kingdom. The system converts wind energy directly to heat in electric water heaters. The wind turbine (WT) is operated in a variable speed mode. The direct current (dc) load consists of a set of resistors connected directly to a diode bridge rectifier. A load controller is used to obtain a better match between the wind turbine and the load. The controller closes the switch if the output dc voltage reaches a given set point, and it opens the switch if the voltage falls below this value. A hysteresis band may be included. The controller could be omitted, but its absence would dramatically reduce the total energy capture at lower wind speeds.

Stand-alone wind energy systems often include batteries, because the available wind does not always produce the required quantities of power. If wind power exceeds the load demand, the surplus can be stored in the batteries. One such system is illustrated in the configuration of FIG. 2 and was manufactured at a rated power of 4 kW by Fortis Wind Energy in the Netherlands. The system originally was designed to power radio stations in mountainous regions. Its batteries are protected against high voltage and overcharging by a charge controller, which simply disconnects the wind turbine from the batteries. Because the wind turbine can run unloaded, it may experience high open-circuit voltage and noise. The wind turbine thus requires some mechanical means of limiting its speed.

Another option for diverting surplus power is to use a dump load. The configuration shown in FIG. 3 incorporates a dump load control and was tested by ECN Wind Energy. Unlike grid-connected wind turbine systems, stand-alone systems usually include dump loads and batteries to maintain the power equilibrium between generators and loads. When the generated power is required by neither the batteries nor the load, the system diverts the power to a dump load, thus preventing the turbine from operating at a high open-circuit voltage. The wind turbine also may continue charging the batteries at a reduced voltage level, depending on the implementation of the charge control.

Existing renewable power technology relies on the combination of several discrete, commercially available components, all with their own dedicated power electronics and controllers obtained from different manufacturers. Each component operates independently without seriously disrupting the operation of the others. On the other hand, such systems rely on several controllers rather than one master controller.

Separate controller components such as battery chargers, inverters, and dump load controllers can be obtained "off-the-shelf"; however, an integrated controller that includes all of the above wind turbine control functions is not readily available. Some wind turbines may have built-in charge control features that divert their own excess power and allow it to dissipate as heat through the wind turbine housing. In most turbine systems, however, the charge controller is an external unit; and although the basic wind turbine package always includes DC rectifiers, it does not necessarily include a load-diverting controller.

In latter years, integrated controllers and systems have been custom-built for a few prototype installations. One example occurs at the Atlantic Wind Test Site (AWTS) in Prince Edward Island, Canada. AWTS has been involved in the research and development of integrated controls for wind-diesel systems (systems that combine wind turbines and diesel gensets). The controls enable wind power systems to be optimally integrated into diesel-powered generating systems. These systems are typically suitable for generating 100 kW to 1 MW, and include a number of discrete components like wind turbines, diesel gen-sets, and energy storage, which are combined together and controlled by a central computerized controller for energy dispatch. However, these systems may not be suitable to be adapted to operate at around or below 10 kW as a stand-alone system.

Lead-acid batteries used in wind energy systems have different performance characteristics than do batteries employed in more traditional applications. Batteries involved in wind energy generation commonly are subject to frequent deep-cycle discharge and irregular charging patterns, usually due to the inconsistent nature of wind speed, poor charging control, and daily load changes. Such effects are potentially damaging to the batteries. To maximize the life span of batteries, it is necessary to use the manufacturer's recommended regulation values, to follow an appropriate system design, and to practise effective charging control.

Recent advances in high-performance static complimentary metal-oxide-semiconductor (CMOS) technology have led to the development of modern digital signal processing (DSP) microcontrollers such as Texas Instruments™ TI TMS320F/C240. DSPs are now employed in the realization of sophisticated control algorithms and real-time system monitoring. In this capacity, they can play a vital role in the design of an integrated control platform that in turn will result in cost-effective and highly reliable wind energy systems.

For at least these reasons, a pressing need exists for a single power electronics package and controller that would enable all components of a wind turbine-battery-dump load stand-alone system to operate as an integrated unit. Such a unified package would eliminate duplication, achieve gains in system efficiency and robustness, and reduce overall system costs.

SUMMARY

According to one aspect of the present invention, there is provided: a renewable energy power conversion apparatus suitable for generating electrical power at an output to drive a load using power obtained from a renewable energy source, the electrical power at the output of the apparatus provided at a substantially pre-determined output voltage level despite variations in the availability of the renewable energy source, the apparatus comprising: (a) a power generator having a generator output, said power generator adapted to convert energy from the renewable energy source into a generated power at a generated voltage level that varies subject to the availability of the renewable energy source, the power generator rated for a pre-determined nominal generator voltage level; (b) a buck-boost power flow channel coupling the generator output of said power generator to the output of the apparatus, said buck-boost power flow channel adapted to provide a first portion of the output power at the output of the apparatus by regulating a first portion of the generated power to a regulated voltage level and by boosting the first portion of the generated power to a voltage level which is substantially compatible with the pre-determined output voltage level; and (c) a bypass power flow channel coupling the generator output of said power generator to the output of the apparatus, said bypass power flow channel adapted to operate in parallel with said buck-boost power flow channel to provide a second portion of the output power by passing the second portion of the generated power directly to the output of the apparatus at a voltage level which is substantially equal to the generated voltage level; wherein most of the generated power flows from the output of said power generator to the output of the apparatus via said bypass power flow channel when the generated voltage level rises substantially above the nominal generator voltage level.

According to another aspect of the present invention, there is provided: a method suitable for controlling the power conversion apparatus recited above, the method comprising the steps of: (a) selectively operating the power conversion apparatus in a selected mode, the selected mode selected from a group of modes comprising: (i) a buck-boost mode whereat all of the output power flows through the buck-boost channel; and (ii) a bypass mode whereat all of the output power flows through the bypass channel; and (b) switching off at least one component of the power conversion apparatus that is not required to operate the power conversion apparatus in the selected mode.

According to yet another aspect of the present invention, there is provided: a computer program product comprising computer readable medium tangibly embodying computer executable instructions for controlling a power conversion apparatus, the computer executable instructions comprising computer executable instructions for carrying out the steps of the method as recited above.

According to yet still another aspect of the present invention, there is provided: an integrated power conversion apparatus suitable for operating a wind turbine, the apparatus comprising: (a) the power conversion apparatus as recited above; (b) an interfacing board coupled to the power conversion apparatus; (c) a DSP-based microcontroller coupled to the power conversion apparatus via the interfacing board; and (d) the computer program product as recited above coupled to the DSP-based microcontroller; wherein said DSP-based microcontroller executes said computer program product to control said power conversion apparatus via said interfacing board.

According to yet further still another aspect of the present invention, there is provided: a method for converting energy from a renewable energy source, the method comprising the steps of: (a) generating an irregular AC voltage; (b) rectifying the AC voltage to produce an irregular DC voltage; (c) regulating the irregular DC voltage to produce a constant DC voltage; (d) stepping up the constant DC voltage to produce a stepped up DC voltage; and (e) converting the stepped up DC voltage into a sinusoidal AC voltage. One embodiment further comprises the step of bypassing the steps of regulating and stepping up under the condition that the rectified irregular DC voltage is compatible with the step of converting, and wherein the irregular DC voltage is used instead of the stepped up DC voltage in the converting step.

Other aspects and features of the present invention will become apparent to those ordinarily skilled in the art upon review of the following description of specific embodiments of a stand-alone wind turbine system, apparatus, and method suitable for operating the same in conjunction with the accompanying drawing figures.

BRIEF DESCRIPTION OF THE DRAWINGS

Embodiments of the present invention will now be described, by way of example only, with reference to the accompanying drawing figures, wherein.

Like reference numerals are used in different figures to denote similar elements.

DETAILED DESCRIPTION OF THE DRAWINGS

Figure 1:
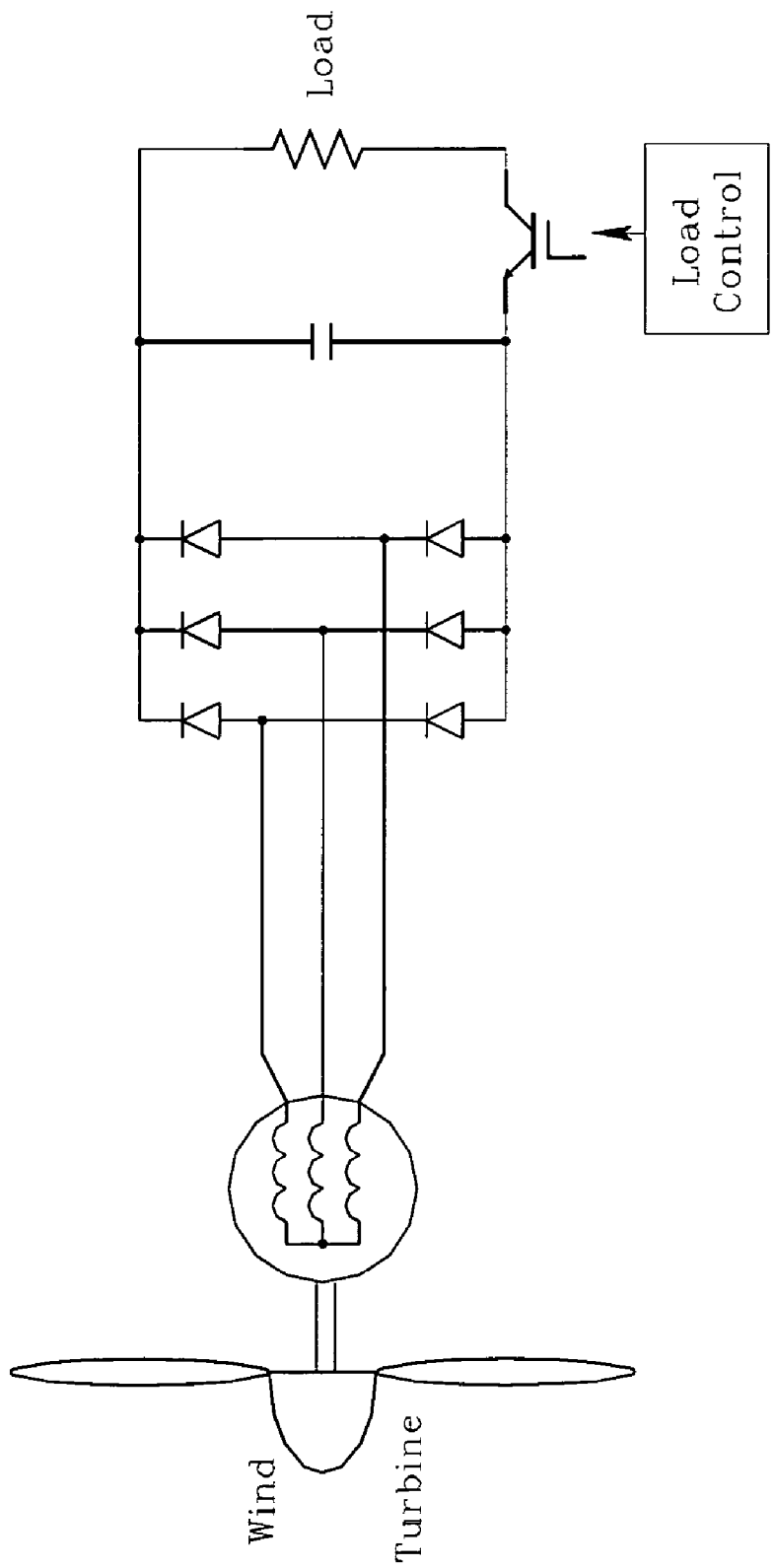
FIGS. 1-3 are block diagrams of PRIOR-ART wind turbine power conversion apparatus.
Figure 2:
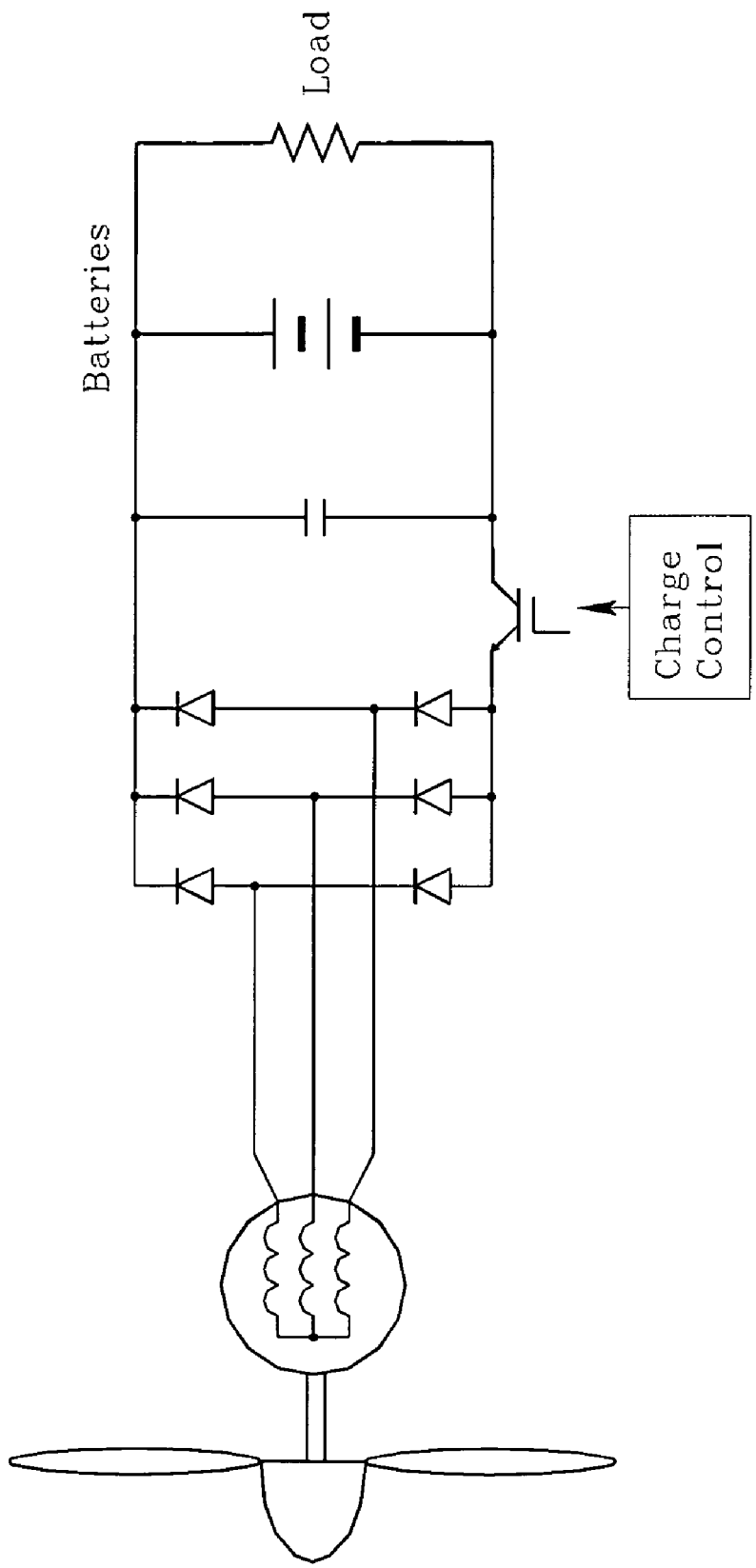
Figure 3:
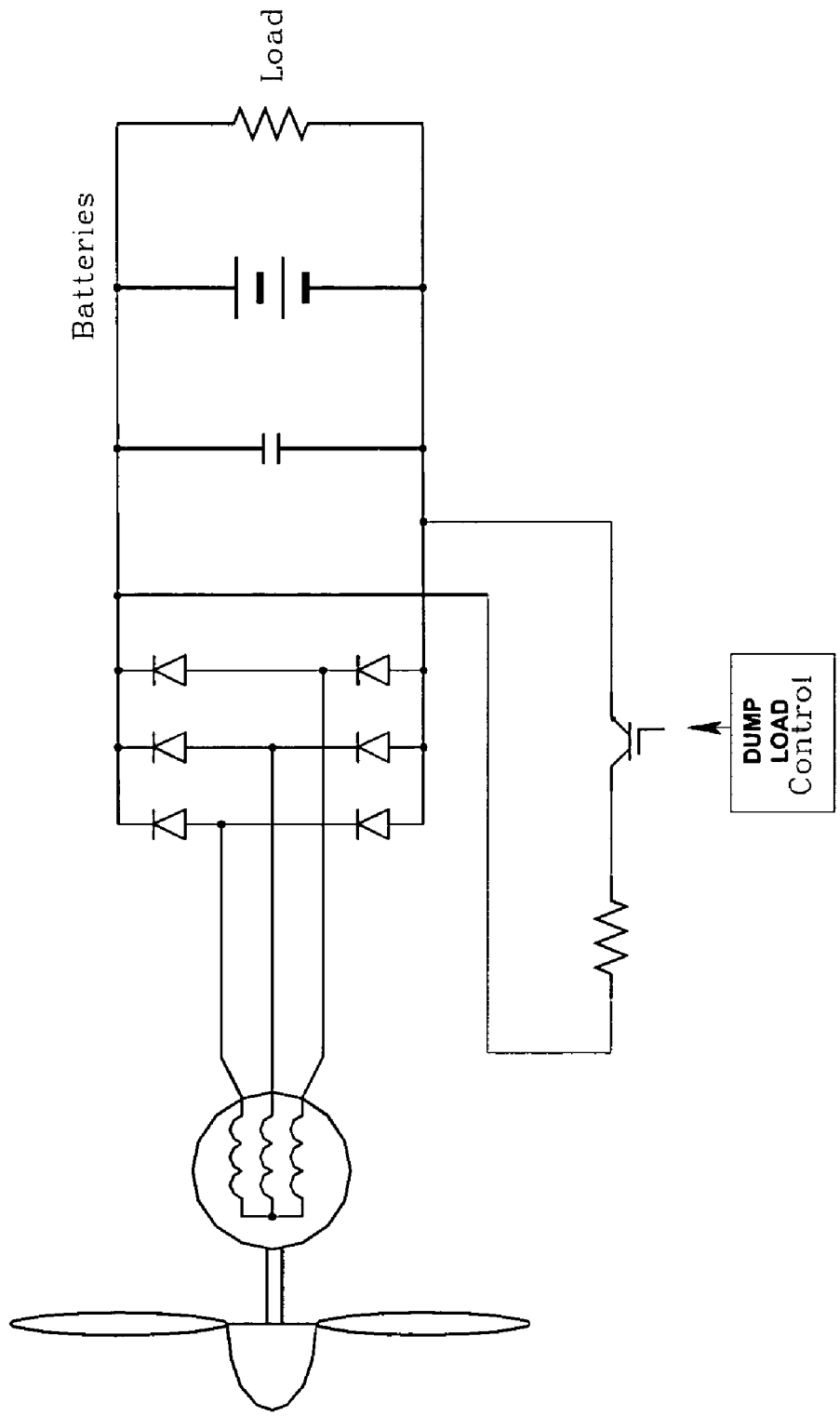
Figure 4:
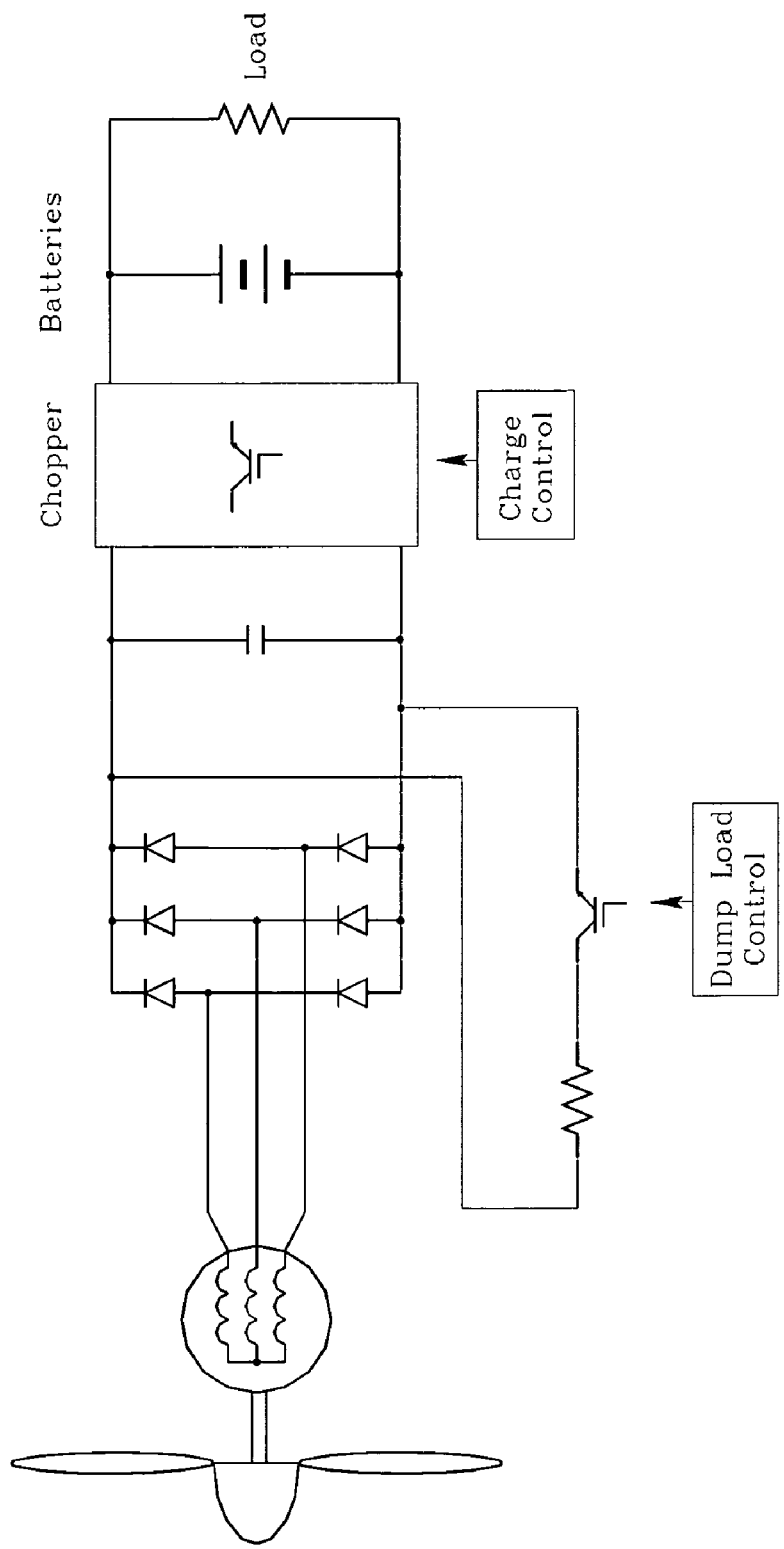
FIGS. 4-6 are block diagrams illustrating intermediate embodiments of power conversion apparatus according to the present invention that build up to the embodiment of FIG. 7.
Figure 5:
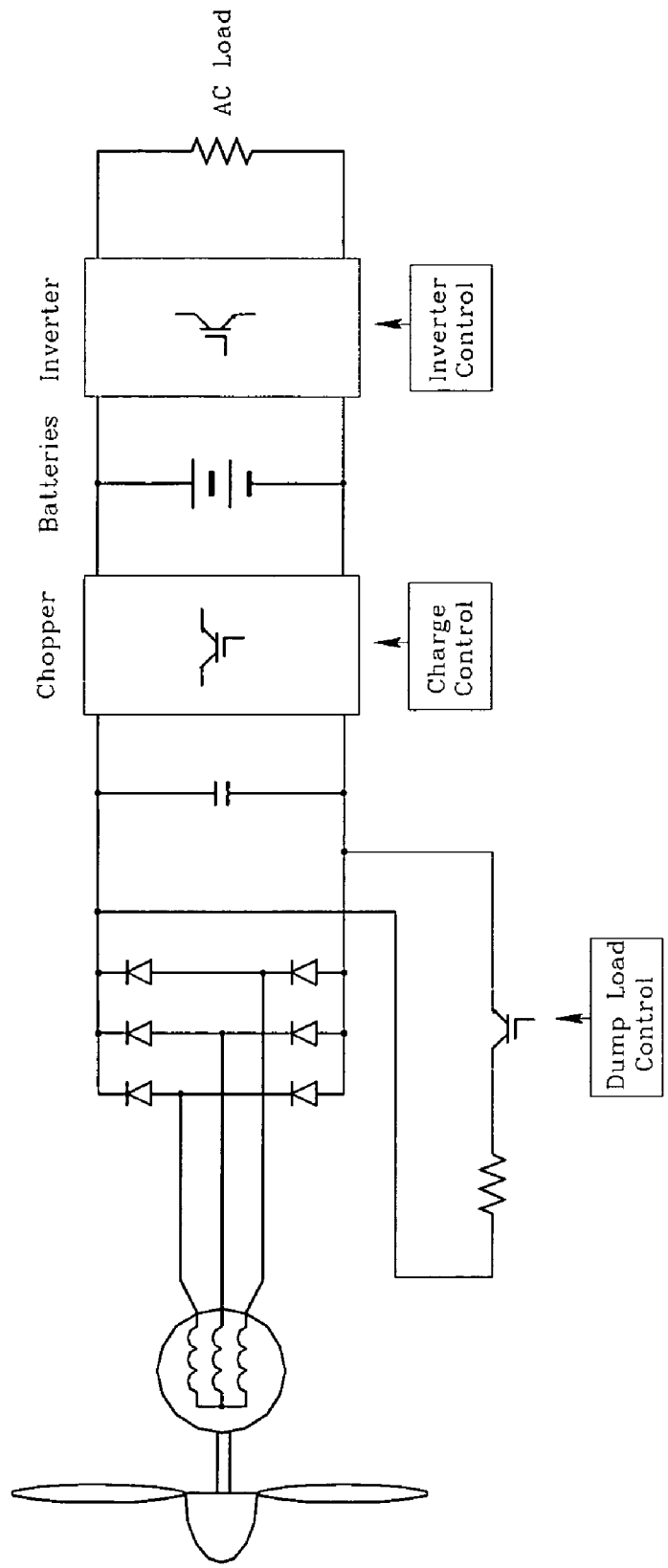
Figure 6:
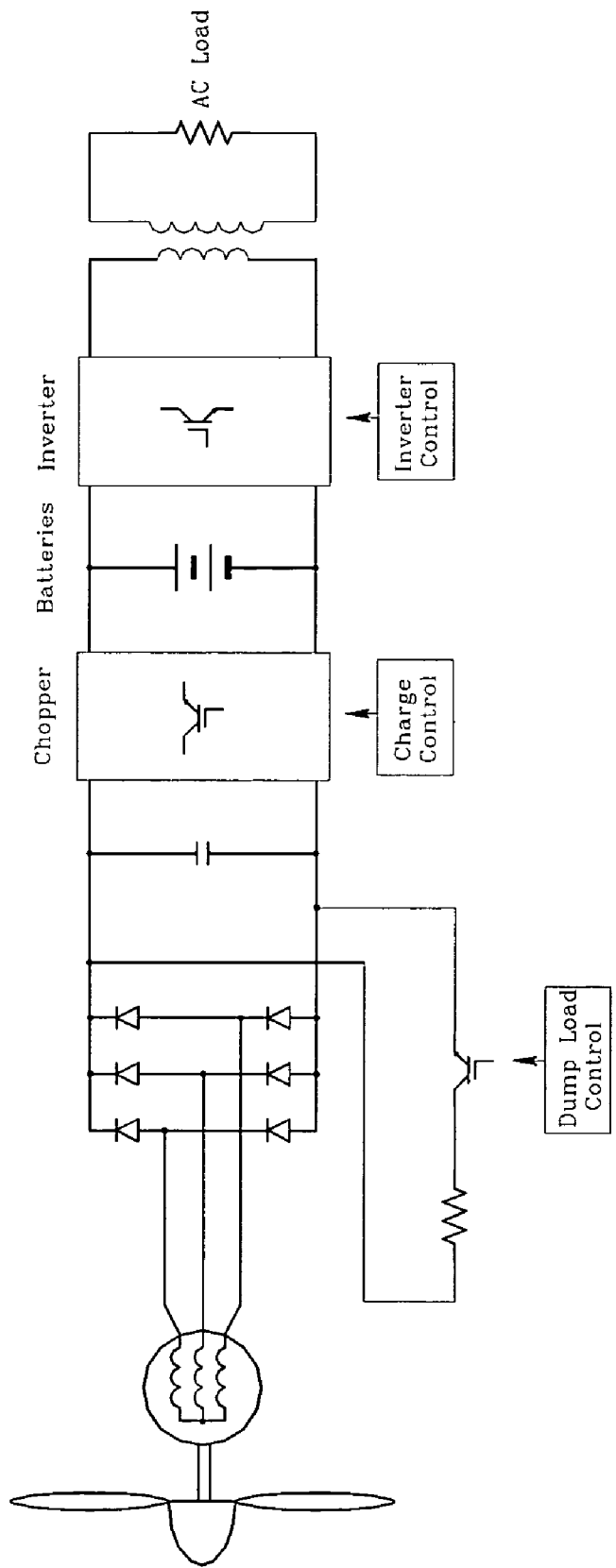
Figure 7:
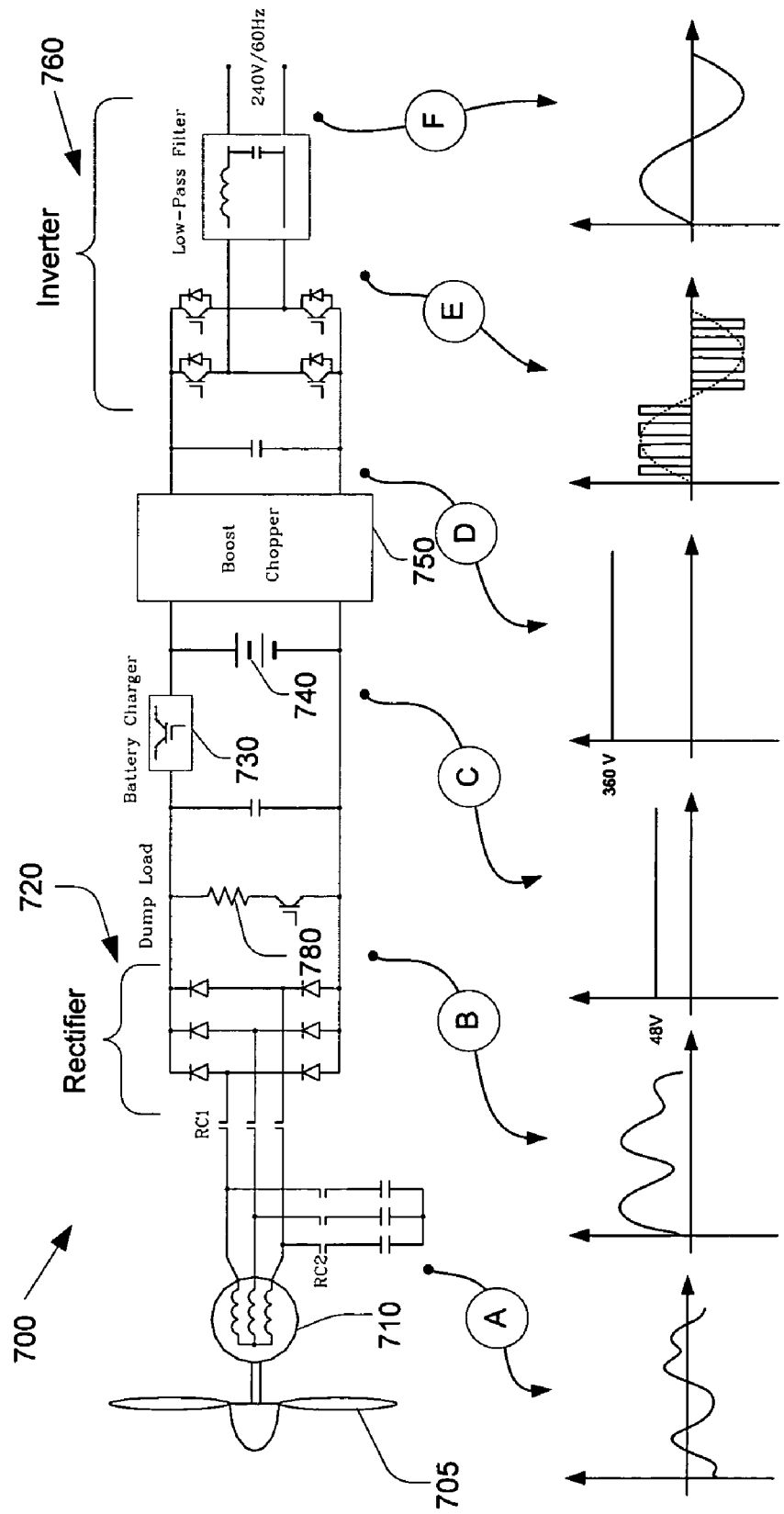
FIG. 7 is a block diagram illustrating a first exemplary embodiment of a wind turbine power conversion apparatus according to the present invention that is suitable for use with the wind turbine systems of FIGS. 8 and 9.

Referring to the drawings, FIGS. 4-6 are block diagrams illustrating intermediate embodiments of power conversion apparatus according to the present invention that build up to the embodiment of FIG. 7.

As shown in FIG. 4, the charging of batteries can be controlled by using a dc chopper. The chopper acts as a dc transformer to reduce or increase the dc voltage. By using a closed-loop feedback controller to change the duty cycle of the chopper, a sophisticated charging control can be achieved.

A dc/ac inverter is added and shown in FIG. 5 to produce a near sinusoidal ac voltage to facilitate the use of standard ac loads. The output voltage can be produced with little distortion by controlling its frequency and amplitude. Since installing multiple battery cells in series can be expensive and often leads to balance issues, the preferred way of maintaining an adequate ac output voltage is to build voltage-boosting schemes into either the inverter output as shown in FIG. 6 or the dc link as shown in FIG. 7.

The transformer used in the configuration shown in FIG. 6 although suitable is uneconomical, because it works at 50 Hz to 60 Hz and thus would need to be large in size.

Figure 8:
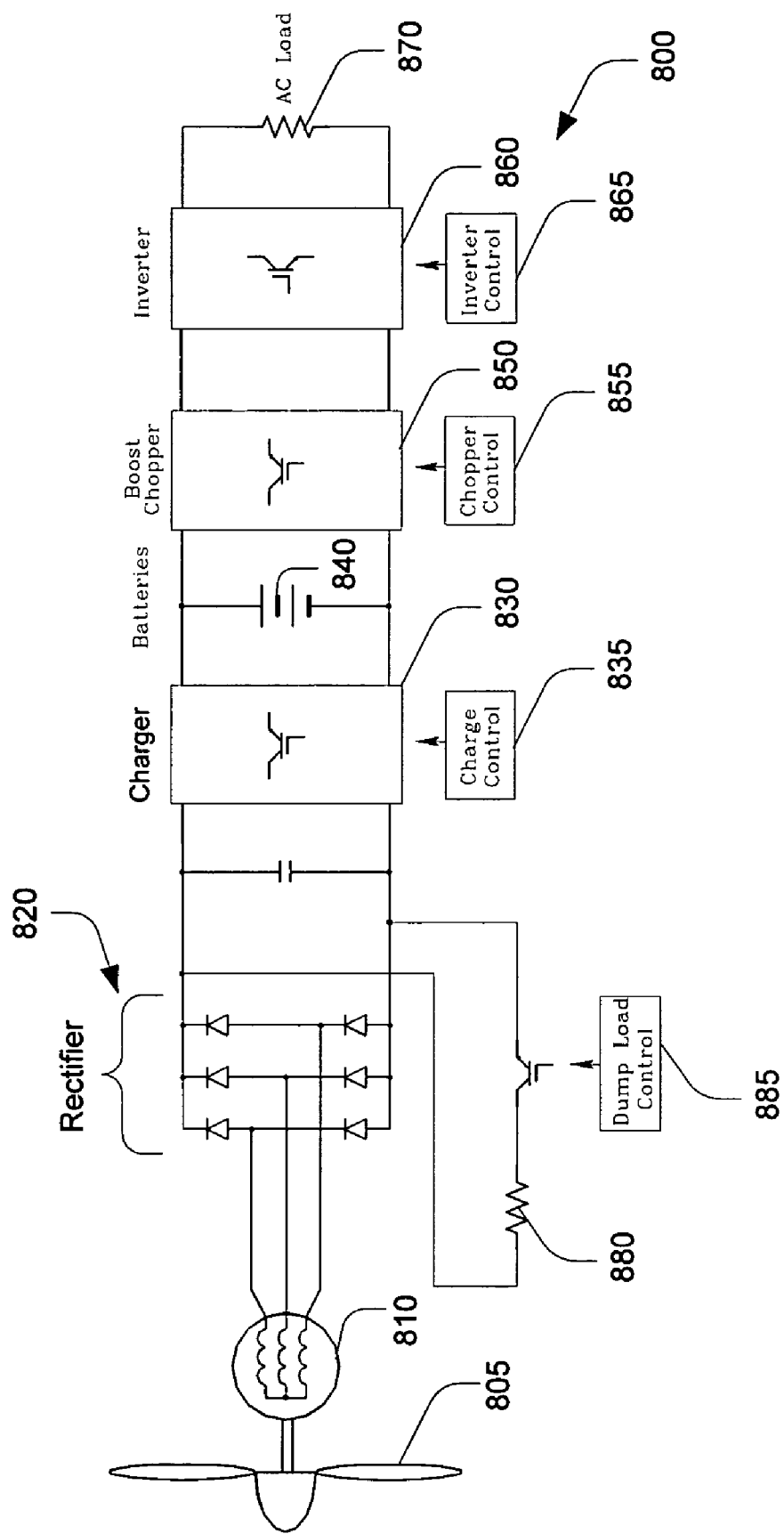
FIG. 8 is a block diagram illustrating a first exemplary embodiment of a wind turbine system according to the present invention.
Figure 9:
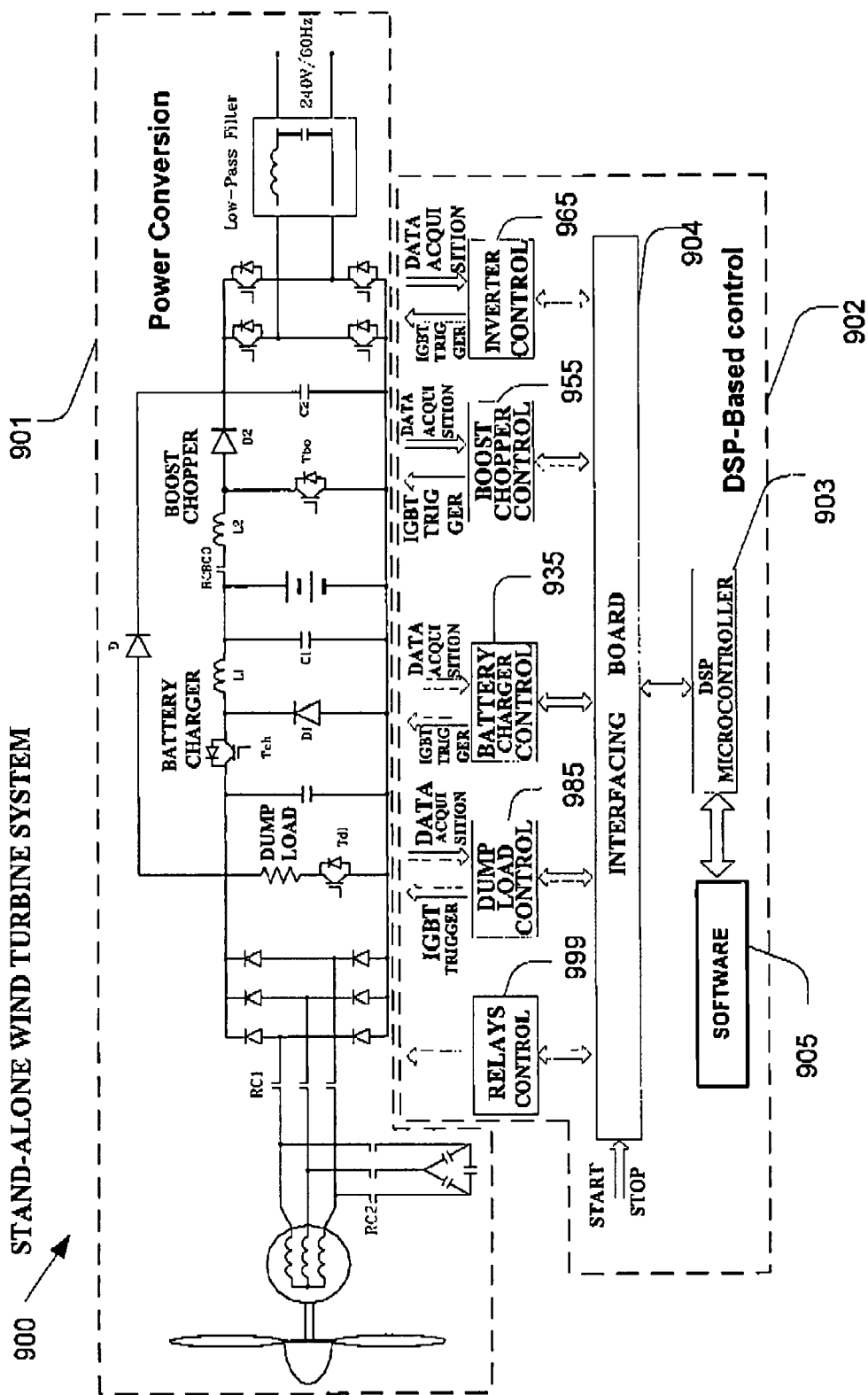
FIG. 9 is a block diagram illustrating a second and preferred exemplary embodiment of a wind turbine system according to the present invention.

FIG. 7 is a block diagram illustrating a first exemplary embodiment of a wind turbine power conversion apparatus according to the present invention that is suitable for use with the wind turbine systems of FIGS. 8 and 9. The stand-alone power structure of system 700 includes a wind turbine 705, a three-phase induction generator 710, a diode rectifier 720, a dump load 780, a battery charger 730, a battery bank 740 (referred to also as batteries or battery), a boost chopper 750, and an inverter 760. When compared with the foregoing configurations of FIGS. 1-6, system 700 offers a suitable combination of low cost and small size and thus provides a good solution to powering standard ac loads. The induction generator 760 is matched to the battery bank 740, so that if battery bank 740 such as a 48V bank, then induction generator 760 has a nominal voltage which is compatible with the voltage of the battery, i.e. around 48V.

Operationally, as the wind turbine 705 rotates under the influence of the wind, induction generator 710 produces an irregular ac voltage at point A, which becomes an irregular dc voltage at point B after passing through the rectifier 720. The battery charger 730 regulates the dc voltage to maintain a constant battery terminal voltage at point C, typically of 48V if a 48V battery bank 740 is used. The voltage is then stepped up to 360V at point D by the boost chopper 750, which ensures that the current flow direction leads from the inverter 760 to the load. The inverter 760 converts the constant dc voltage into sinusoidal ac voltage at points E and F for providing power to the load.

Each waveform at points A, B, C, D, E and F correspond to the output of the following corresponding steps in a first embodiment of a method provided according to the present invention: generating an irregular AC voltage; rectifying the AC voltage to produce an irregular DC voltage; regulating the irregular DC voltage to produce a constant DC voltage; stepping up the constant DC voltage to produce a stepped up DC voltage; and converting the stepped up DC voltage into a sinusoidal AC voltage. A preferred embodiment further comprises the step of bypassing the steps of regulating and stepping up under the condition that the rectified irregular DC voltage is compatible with the step of converting, and wherein the irregular DC voltage is used instead of the stepped up DC voltage in the converting step.

Referring now to FIG. 8, FIG. 8 is a block diagram illustrating a first exemplary embodiment of a wind turbine system according to the present invention. The stand-alone power structure of system 800 includes a wind turbine 805, a three-phase induction generator 810, a diode rectifier 820, a dump load 880, a battery charger 830, a battery bank 840 (referred to also as batteries or battery), a boost chopper 850, and an inverter 860. All of these elements find correspondence in similarly referenced elements of system 700 of FIG. 7, specifically 705, 710, 720, 780, 730, 740, 750 and 760 respectively. Additionally, system 800 also includes a charge controller 835, a chopper controller 855, an inverter controller 865, and a dump load controller 885.

Operationally, battery charger 830, boost chopper 850, inverter 860 and dump load 880 are controlled by the following control modules, respectively: charge control 835, chopper control 855, inverter control 865 and dump load control 885. These controllers interoperate as follows. If the load 870 consumes less power than is being produced by generator 810, excess power is transferred to the battery bank 840 by the charge controller 835. When the load consumes more power than is being produced by the generator 810, the battery bank 840 provides the additional power required. If the power being produced is not required for neither charging the battery nor driving the load, the dump load 880 is switched on by the dump load controller 885, and all surplus power is fed to the dump load 880.

The combination of interoperating controllers presents some advantages from the standpoint of integration. However, from the standpoint of high efficiency, which remains a crucial design goal of power conversion systems, system 800 still leaves room for improvement as the components experience power loss, resulting in reduced overall efficiency for the entire system 800. For example, if the induction generator for this system is designed at a nominal output of 48V to be compatible with the battery bank 840, its output voltage range is therefore very limited. Even under the most optimal conditions, the operating efficiency of dc choppers normally lies between 91% and 94%. The efficiency of the whole system 800 thus is constrained by the battery charger 830 and the boost chopper 850, particularly in the case where the battery charger is also a boost chopper.

Referring now to FIG. 9, FIG. 9 is a block diagram illustrating a second and preferred exemplary embodiment of a wind turbine system according to the present invention. The DSP-controlled stand-alone system 900 includes two major parts: a power conversion unit 901, and a DSP-based control unit 902. The power conversion unit 901 performs all the power-converting functions, while the latter DSP-based control unit 902 performs all real-time control functions required by the power conversion unit 901. The DSP-based control unit 902 combines a fast, dynamic response with a robust performance.

Figure 10:
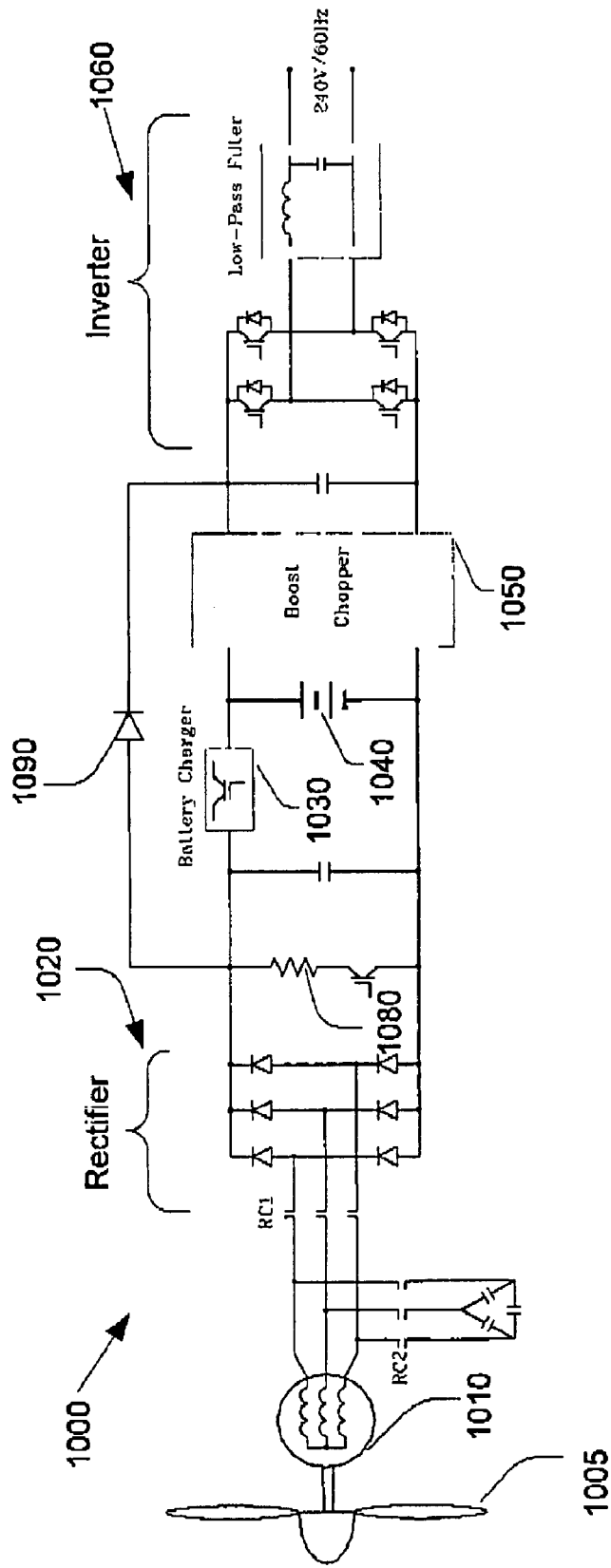
FIG. 10 is a block diagram illustrating a second and preferred exemplary embodiment of a wind turbine power conversion apparatus according to the present invention that is suitable for use with the wind turbine systems of FIGS. 8 and 9.

The power conversion unit 901 is preferably system 1000 of FIG. 10, but a person having ordinary skill in the art may effect substitutions to unit 901 for an alternate power conversion unit and still benefit from advantages, such as the integration, provided by the DSP-based control unit 902 in view of the present specification. Likewise, a person having ordinary skill in the art may effect substitutions to unit 902, and still benefit from advantages, such as high efficiency, provided by unit 901 in view of the present specification.

The DSP-based control unit 902 preferably includes a DSP microcontroller 903, an interfacing board 904, a dump load control module 985, a battery charger control module 935, a boost chopper control module 955, an inverter control module 965, and relays control module 999 for system protection.

In one embodiment, inverter control module 965 uses pulse width modulation (PWM) for inverter control, as can be appreciated by a person having ordinary skill in the art of digital control strategies for PWM inverters used in wind energy conversion systems.

The DSP-based control unit 902 enables comprehensive integrated control that features battery-charging control, battery voltage boost control, dump load control, pulse width modulation (PWM) inverter control, and system protection.

Control operation of the battery charger (including SOC estimation and optimal charging control), the dump load, and the boost chopper will all be described in greater detail below, as will the interfacing board, and the DSP microcontroller and relevant software configuration.

Referring to FIG. 10, FIG. 10 is a block diagram illustrating a second and preferred exemplary embodiment of a wind turbine power conversion apparatus according to the present invention that is suitable for use with the wind turbine systems of FIGS. 8 and 9. The stand-alone power structure of system 1000 includes a wind turbine 1005, a diode rectifier 1020, a dump load 1080, a battery charger 1030, a battery bank 1040 (referred to also as batteries or battery), a boost chopper 1050, and an inverter 1060. All of these elements find correspondence in similarly referenced elements of system 700 of FIG. 7, specifically 705, 720, 780, 730, 740, 750 and 760 respectively. However, system 1000 differs from systems 700 in at least two respects. First, in system 1000, the three-phase induction generator 1010 is matched to the output of the inverter 1060 as opposed to the battery bank 1040, so that if the output of the inverter 1060 is rated for 240V, then induction generator 1010 has a nominal voltage of around 270V, i.e. the generator is matched closer to the voltage of the output than to the battery as was the case in FIG. 7. Second, system 1000 introduces a bypass diode 1090 to form a bypass channel so as to enable power to flow in two channels, which operate in parallel when compared to system 700. The structure of system 1000 was conceived to overcome the efficiency drawbacks of the structure of system 700.

In this regard, the power conversion structure of system includes a buck-boost power flow channel, and a bypass power flow channel. The bypass power flow channel provides most of the generated power to the output when the generator operates above its nominal rated voltage, i.e. in conditions of high wind.

In greater detail, the induction generator 1010 has a nominal output of 270V which is substantially matched to the output of the inverter 1060, as opposed to 48V which would be matched to the battery bank 1040. Therefore, the induction generator 1010 in the structure of system 1000 has a wider range of output voltage (between 50V and 440V), which is determined by wind speed. The system 1000 includes a diode bypass channel that bypasses the battery charger 1030 and the boost chopper 1050 during high wind speeds, thus reducing system losses. As in system 700, the boost chopper 1050 is designed to step up the battery terminal voltage to 360V. When the output voltage of the generator 1010 is higher than its rated output voltage which causes the dc link voltage of the inverter to be higher than 360V, the boost chopper 1050 shuts down, and most of the energy flows through the bypass diode 1090 channel. When the generator's 1010 output voltage leads to a dc link voltage less than 360V, energy passes through the buck-boost channel, which includes the battery charger 1030 and the boost chopper 1050. The boost chopper 1050 thus switches on only when the wind speed is too low to drive the generator 1010 at its rated output voltage. This feature enables the efficiency of the structure of system 1000 to be higher than that of traditional structures, as well as the structure of system 700.

The resulting structure of system 1000 is a wind turbine-battery-dump load hybrid, and it features the following advantages, summarized in Table 1:

TABLE 1

Comparison between the structure of system 700 and the structure of system 1000.

| | System 1000 Structure | System 700 Structure |
|---|---|---|
| Induction generator output line-to-line voltage | 270 V nominal, matched closer to inverter | 48 V nominal, substantially matched closer to battery voltage |
| Range of speed and voltage level | wide (50-440 V) | narrow (0-80 V) |
| Battery charger | optionally only charges the batteries in bypass mode | transfers power to the load and charges the batteries |
| Boost chopper | switch on only when wind speed is too low | operates continuously ($\eta$ = 91-94%) |

Figure 11:
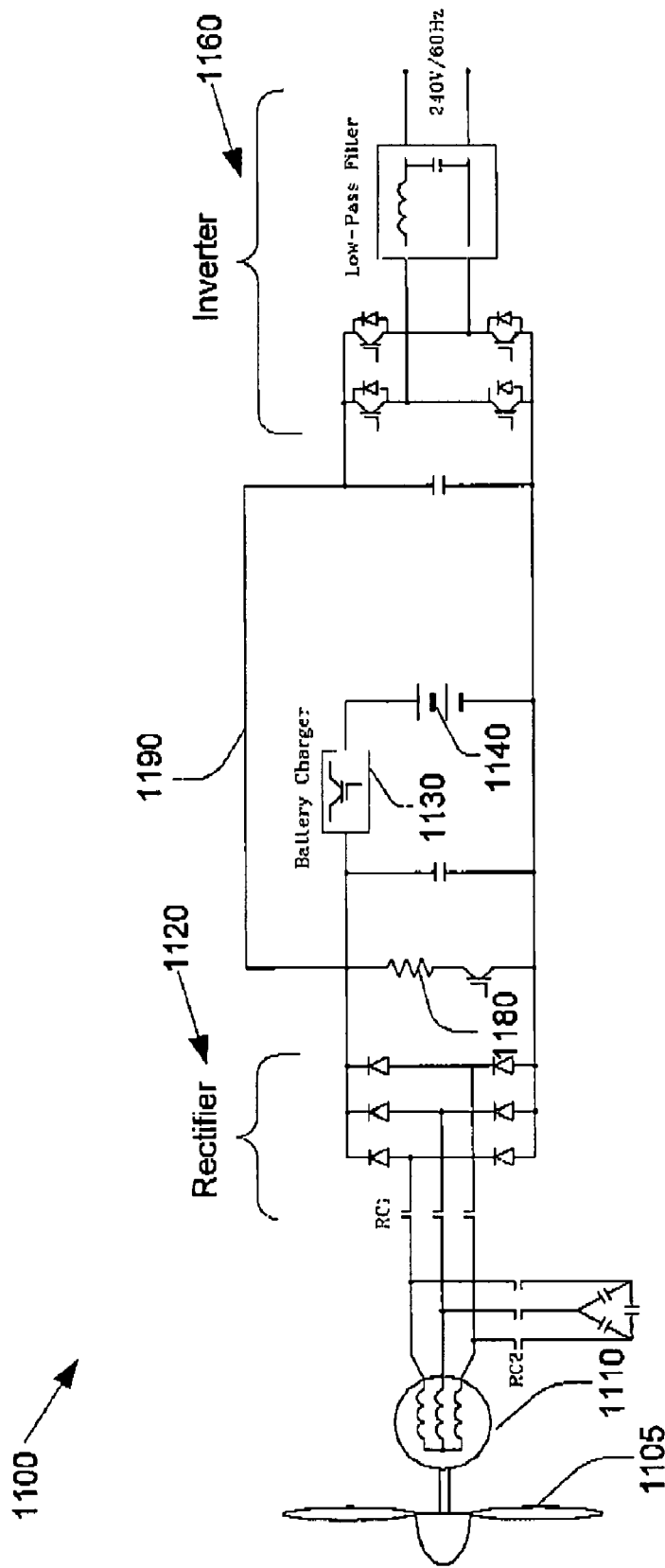
FIG. 11 is a block diagram illustrating an equivalent structure to the apparatus of FIG. 10 operating in bypass mode.
Figure 12:
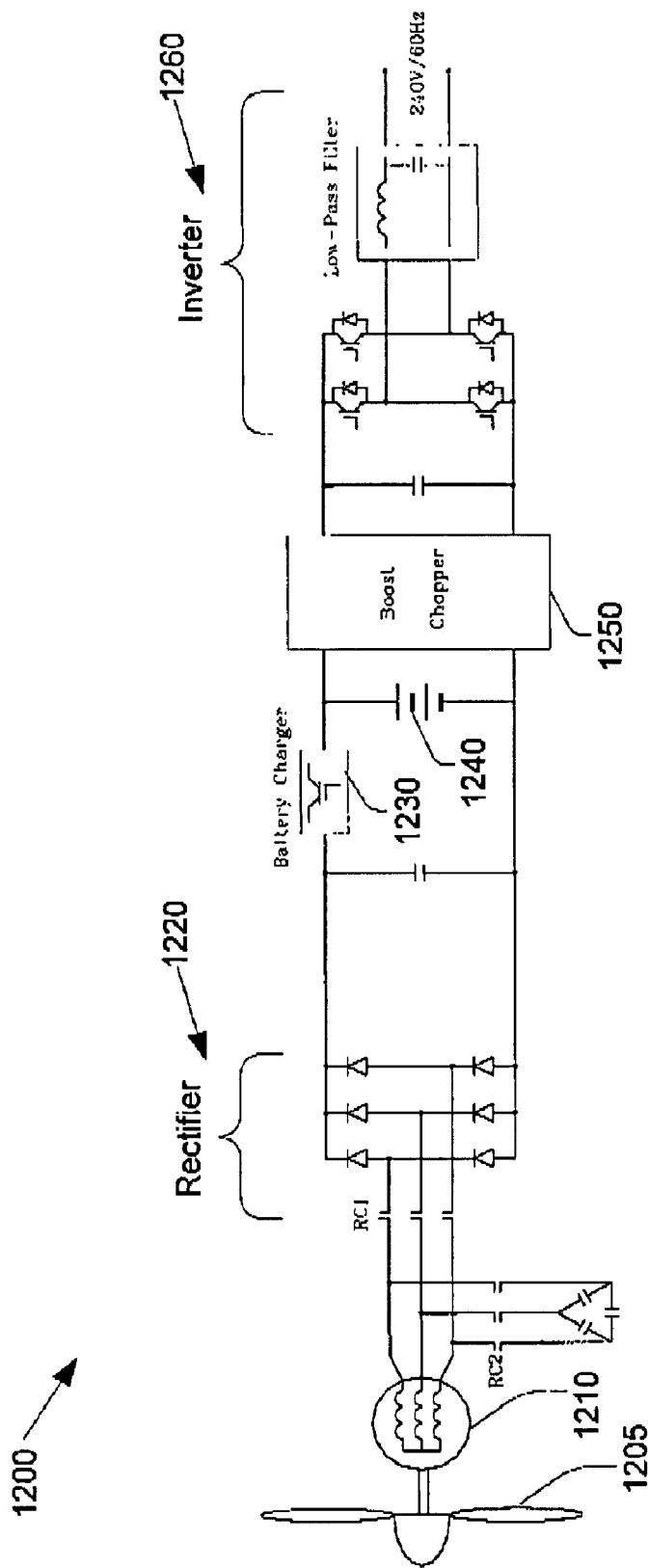
FIG. 12 is a block diagram illustrating an equivalent structure to the apparatus of FIG. 10 operating in buck-boost mode.
Figure 13:
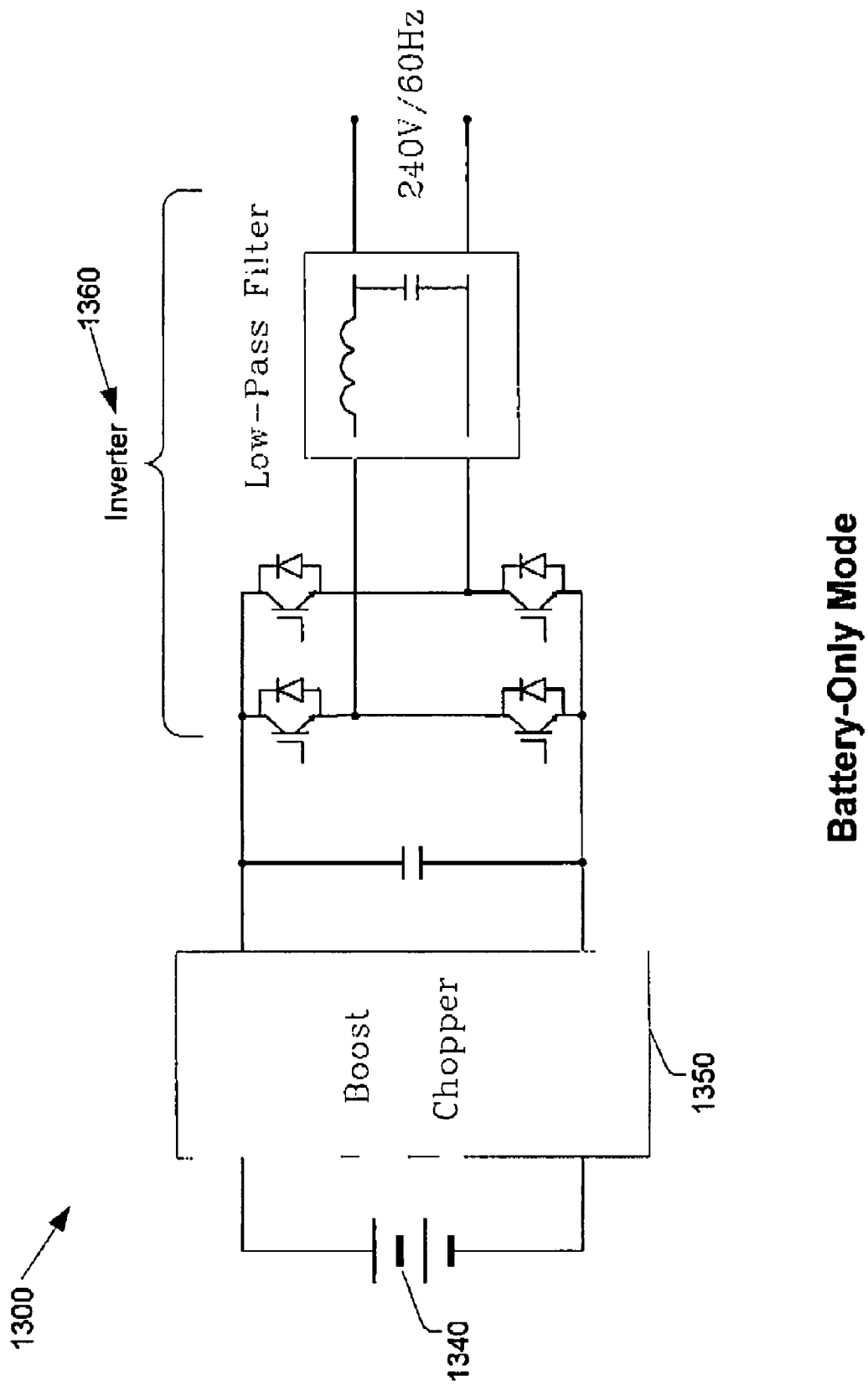
FIG. 13 is a block diagram illustrating an equivalent structure to the apparatus of FIG. 10 operating in battery-only mode.

Operationally, apparatus 1000 has three separate modes of operation: bypass mode, buck-boost mode, and battery-only mode; each of which is illustrated with equivalent structures in FIGS. 11, 12 and 13 respectively. The following three tables summarize the interactions between components of the system 1000 under a variety of operating conditions: Table 2, Table 3 and Table 4. Each of these tables is described in greater detail below.

Interactions between the battery charger 1030 and the boost chopper 1050 play a crucial role in ensuring that the state-of-charge (SOC) for the battery bank 1040 remains within a safe range. When the SOC exceeds 120%, the battery charger 1030 shuts down to prevent batteries 1040 from overcharging; conversely, when the SOC drops to 30%, the boost chopper 1050 shuts down to prevent batteries from over discharging (Table 2). These specific values are exemplary only. Set points for the SOC values can be modified according to requirements of the battery manufacturer by a person having ordinary skill in the art in view of this specification.

TABLE 2

Interactions between battery charger and boost chopper.

| Battery 1040 SOC | Battery Charger 1030 | Boost Chopper 1050 |
|---|---|---|
| Soc $\geq$ 120% | OFF | ON |
| 30% < SOC < 120% | ON | ON |
| SOC $\leq$ 30% | ON | OFF |

Table 3 shows the interactions between the wind turbine generator 1010 and the boost chopper 1050. The boost chopper 1050 does not turn on unless the generator 1010 is unable to maintain its output voltage of 270V, due to insufficient wind speed. The specific value of 270V is exemplary only.

TABLE 3

Interactions between wind turbine generator and boost chopper.

| Line-to-line output voltage of wind turbine generator 1010 | Boost chopper 1050 |
|---|---|
| $\geq$270 V | OFF |
| <270 V | ON |

Similarly, the dump load 1040 is activated only when the output voltage of the generator 1010 reaches its upper limit of 440V (Table 4). The specific value of 440V is exemplary only.

TABLE 4

Interactions between wind turbine generator and dump load.

| Line-to-line output voltage of wind turbine generator 1010 | Dump Load 1080 |
|---|---|
| $\geq$440 V | ON |
| <440 V | OFF |

An advantage of the present invention is that by using higher voltage generators, the lower rated current at the same power rating reduces ohmic losses.

Referring to FIG. 11, FIG. 11 is a block diagram illustrating an equivalent structure to the apparatus of FIG. 10 operating in bypass mode. The apparatus 1100 is equivalent to apparatus 1000 when the latter operates in bypass mode. This occurs when the speed of the wind captured by wind turbine 1105 is sufficient to drive the generator 1110 at around its rated nominal output voltage, i.e. at around the voltage at the inverter 1160. The wind turbine generator 1110 is able to power the load through the bypass diode 1190 without relying on the battery charger 1130 or the boost chopper, even though the DC voltage may be irregular after the rectifier 1120. At the same time, a limited current can be regulated to charge the battery bank 1140 (referred to also as batteries or battery) if required using battery charger 1130. The dump load 1180 is activated if the power becomes excessive.

Referring to FIG. 12, FIG. 12 is a block diagram illustrating an equivalent structure to the apparatus of FIG. 10 operating in buck-boost mode. The apparatus 1200 is equivalent to apparatus 1000 when the latter operates in buck-boost mode. This occurs when the wind speed is only moderate, and the wind turbine 1205 and wind turbine generator 1210 is unable operate at around its rated nominal output voltage. In this mode, the generator 1210 charges the batteries 1240 using the DC voltage on the output of the rectifier 1220, and the batteries 1240 power the load through the boost chopper 1250. The equivalent structure for this mode closely resembles that of the structure of system 700, except that the generator 1210 has a different rated nominal output voltage than generator 710.

Referring to FIG. 13, FIG. 13 is a block diagram illustrating an equivalent structure to the apparatus of FIG. 10 operating in battery-only mode. The apparatus 1300 is equivalent to apparatus 1000 when the latter operates in battery-only mode. This occurs during conditions of little or no wind such that the battery bank (referred to also as batteries or battery) 1340 alone is used to power the load via inverter 1360. The boost chopper 1350 shuts down at low voltage to prevent the batteries from over discharging.

Figure 14:
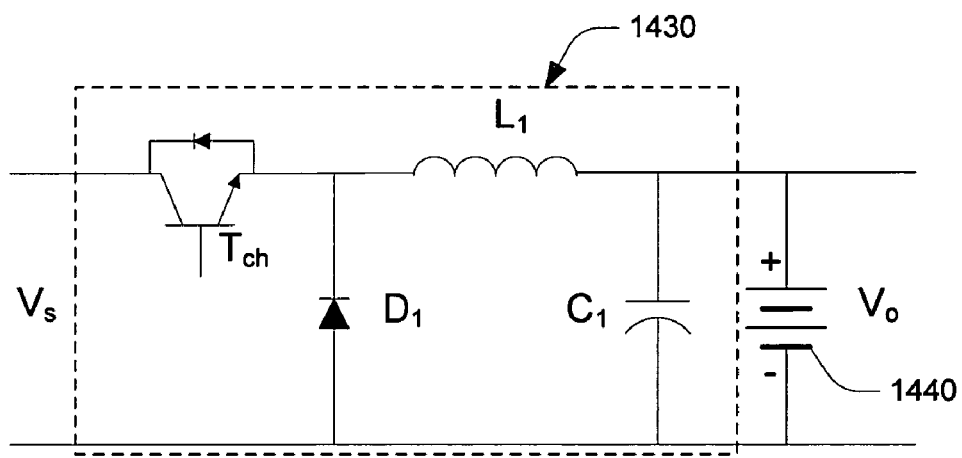
FIG. 14 is a block diagram illustrating an exemplary embodiment of a buck chopper according to the present invention that is suitable for use as the battery charger in the wind turbine systems of FIGS. 8 and 9.

Referring to FIG. 14, FIG. 14 is a block diagram illustrating an exemplary embodiment of a buck chopper according to the present invention that is suitable for use as the battery charger in the wind turbine systems of FIGS. 8 and 9. The input dc voltage of the battery charger 1430 varies from 70V to 600V; it has a nominal voltage of 365V DC that corresponds to a 270V line-to-line root mean square (rms) value for the rated output voltage of the generator. Consequently, a buck chopper is used to maintain a constant output voltage while the battery is being charged.

Figure 15:
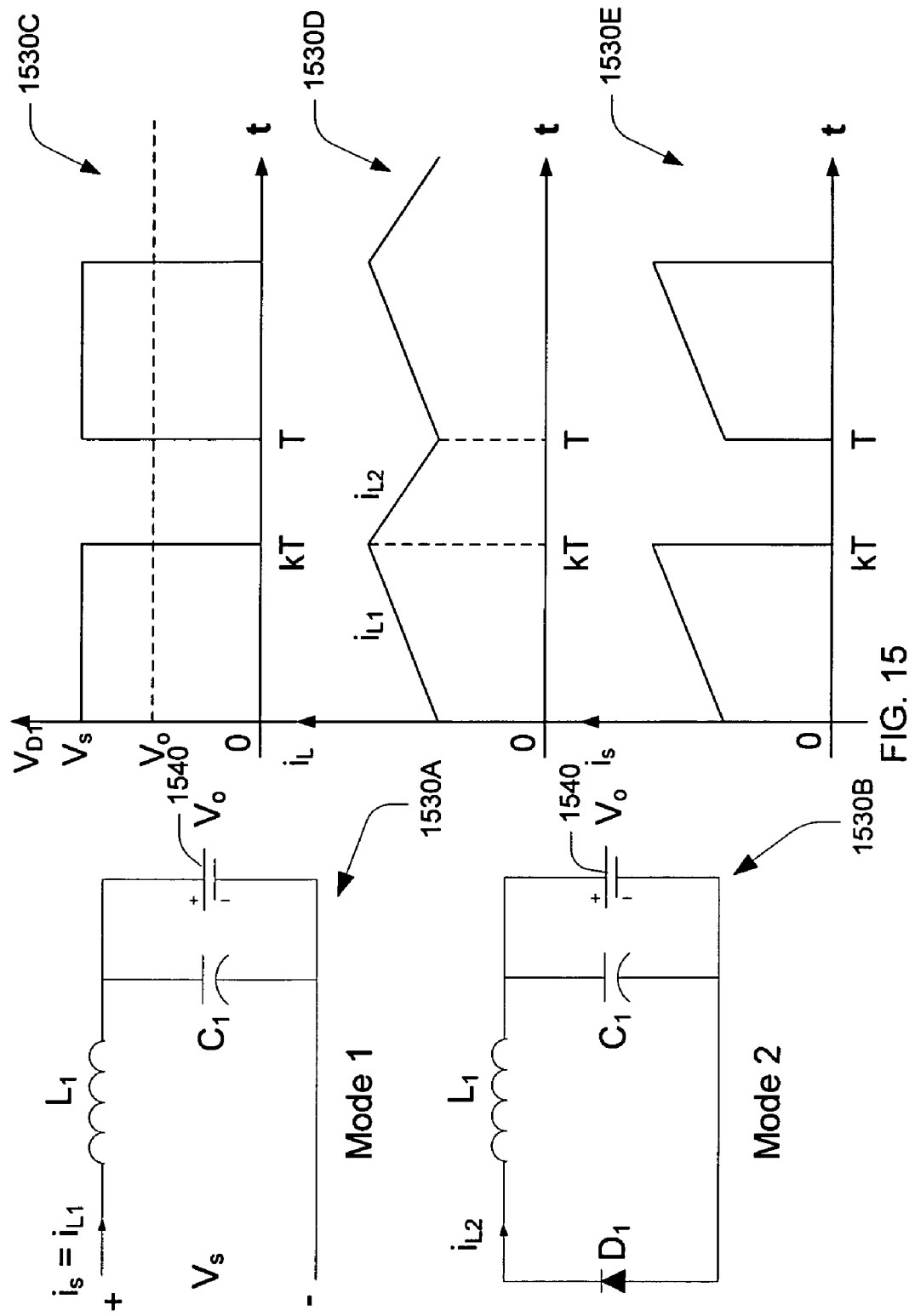
FIG. 15 is a block diagram illustrating equivalent structures and corresponding waveforms for the two modes of operation of the buck chopper battery charger of FIG. 14.

Referring to FIG. 15, FIG. 15 is a block diagram illustrating equivalent structures and corresponding waveforms for the two modes of operation of the buck chopper battery charger of FIG. 14. The operation of buck choppers can be divided into two modes as shown in FIG. 15. Mode 1 1530A begins when transistor Tch of FIG. 14 is switched on at t=0. As the input current 1530E rises, it flows through filter inductor L1, filter capacitor C1, and the load, which in this case is the battery bank 1540. Mode 2 1530B begins when transistor Tch of FIG. 14 is switched off at t=kT, where k is the duty cycle and T is the switching period. The freewheeling diode D1 conducts 1530C, due to energy stored in the inductor L1, and the inductor current continues to flow through L1, C1, the battery bank 1540, and D1. The inductor current 1530D falls until transistor Tch is switched on again in the next cycle. The waveforms 1550C, 1550D and 1550E further illustrate the operation of the buck chopper in both operating modes.

To maintain a steady-state condition, the input (in volt-seconds) applied to the inductor in the forward direction when Tch is on must equal the reverse output (also in volt-seconds) applied when Tch is off. Hence, $$\int_0^T v_L(t) = (V_S - V_O) \cdot kT + (-V_O) \cdot (1-k)T = 0,$$

By rearranging the terms, we can obtain $$V_O = V_S \times \frac{kT}{T} = kV_S,$$

Assuming a lossless circuit, $$V_S I_S = V_O I_O = kV_S I_O,$$

and the average input current is $I_S = kI_O$.

The foregoing calculations indicate that a buck chopper is capable of maintaining a low voltage simultaneously with a high current output in battery-charging applications.

Figure 16:
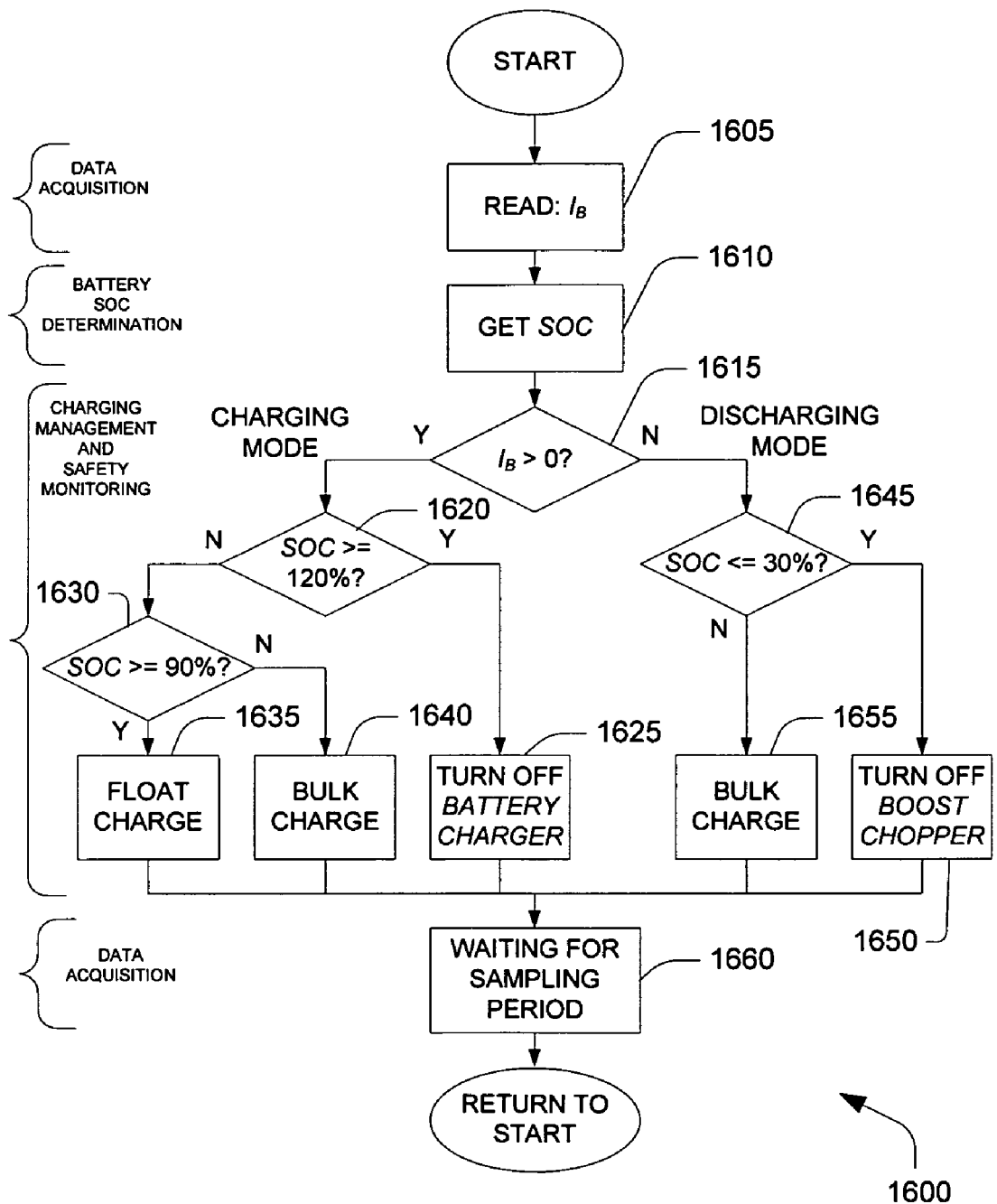
FIG. 16 is a flowchart illustrating a first exemplary embodiment of a battery management method according to the present invention that is suitable for use with the wind turbine systems of FIGS. 8 and 9.

Referring to FIG. 16, FIG. 16 is a flowchart illustrating a first exemplary embodiment of a battery management method according to the present invention that is suitable for use with the wind turbine systems of FIGS. 8 and 9.

An embodiment of a Battery Management Scheme (BMS) method conceived, features the following advantages:
the ability to program the rate of battery charging;
protection against overcharge and overdischarge of batteries;
limitations on the charging current/voltage and discharging current/voltage;
the ability to automatically switch between the two stages of battery charging;
a built-in digital SOC estimation;
periodic calibration for the SOC;
a display of on-request status information; and
the ability to manage a wide range of lead-acid battery models.

Because the battery bank is the weakest element in stand-alone systems, its operation should be carefully controlled. As shown in the flowchart 1600 of FIG. 16, all modes of battery operation are monitored. If the battery bank is in charging mode, steps protect the batteries from overcharging and regulate the charging current or voltage according to their SOC. When the battery bank is in discharging mode, steps protect the battery from over discharging.

As shown on the flow chart 1600 of FIG. 16, the steps can be grouped into the following tasks: data acquisition, battery SOC determination, charging management, and safety monitoring.

Data acquisition steps include steps 1605 and 1660. At step 1605, the battery current Ib is determined. This can be accomplished, for example, by reading a register for a sampled analog-to-digital (A/D) measurement of battery current. Step 1660 involves waiting for a predetermined sampling period, and as shown in flow chart 1600 occurs after the tasks of battery SOC determination, charging management, and safety management. Alternatively, since the method returns to the start after step 1660, this step could occur prior to step 1605.

After the battery current Ib determination step 1605, battery SOC determination is performed at step 1610. State-of-charge (SOC) refers to the level of charge that a battery retains: a 100% SOC indicates a fully charged battery, and a 0% SOC indicates a dead battery. Accurately determining the SOC for a battery over time is crucial to the implementation of battery-charging control strategies.

Several methods are contemplated to determine the SOC at step 1610. These include ampere-hour (Ah) balancing, specific gravity (SG) measurement, and terminal voltage measurement. Because the measurements of specific gravity and terminal voltage require stabilization periods, the preferred method of assessing the battery SOC for dynamic systems is to apply Ah balancing. Ah balancing measures the current flowing in and out of the battery to determine the net capacity remaining in the battery. An embodiment of a method suitable for use as step 1610 will be described in greater detail below with reference to FIG. 26.

The remaining steps of the flowchart 1600 relate to charging management and safety monitoring, and will be described next.

After the SOC determination step 1610, at step 1615 a battery mode, either charging mode or discharging mode. If Ib is greater than zero, the battery is in charging mode and the next step is step 1620; otherwise the battery is in discharging mode and the next step is step 1645.

In charging mode, at step 1620, the SOC determined at step 1610 is compared to a maximum charge SOC set point, such as for example 120%. If it is determined that the SOC is greater or equal to the maximum charge SOC set point, the battery charger is turned off at step 1625. In this regard, steps 1620 and 1625 are safety monitoring steps which protect the battery from over charge. If in the alternative, it is determined that the SOC is less than the maximum charge SOC threshold set point, step 1630 ensues.

At step 1630, the SOC determined at step 1610 is compared to a charge mode SOC set point, such as for example 90%. If it is determined that the SOC is greater or equal to the charge mode SOC set point, the battery charger is operated in float charge mode at step 1635. If in the alternative, it is determined that the SOC is less than the charge mode SOC threshold set point, the battery charger is operated in bulk charge mode at step 1640. In this regard, steps 1620, 1630, 1635 and 1640 are charge management steps.

In discharging mode, at step 1645, the SOC determined at step 1610 is compared to a minimum charge SOC set point, such as for example 30%. If it is determined that the SOC is less than or equal to the minimum charge SOC set point, the boost chopper is turned off at step 1650. In this regard, steps 1645 and 1650 are safety monitoring steps. If in the alternative, it is determined that the SOC is greater than the minimum charge SOC threshold, step 1655 ensues whereat the charger is operated in bulk charge mode. In this regard, steps 1645 and 1655 are charge management steps.

Advantageously, the safety monitoring steps not only protect the battery from over discharge and over charge, but also further contribute to the overall efficiency of the wind turbine system as they selectively turn off the battery charger and boost chopper, two components which are inherently inefficient, particularly in the case where the battery charger is also a buck chopper.

Figure 17:
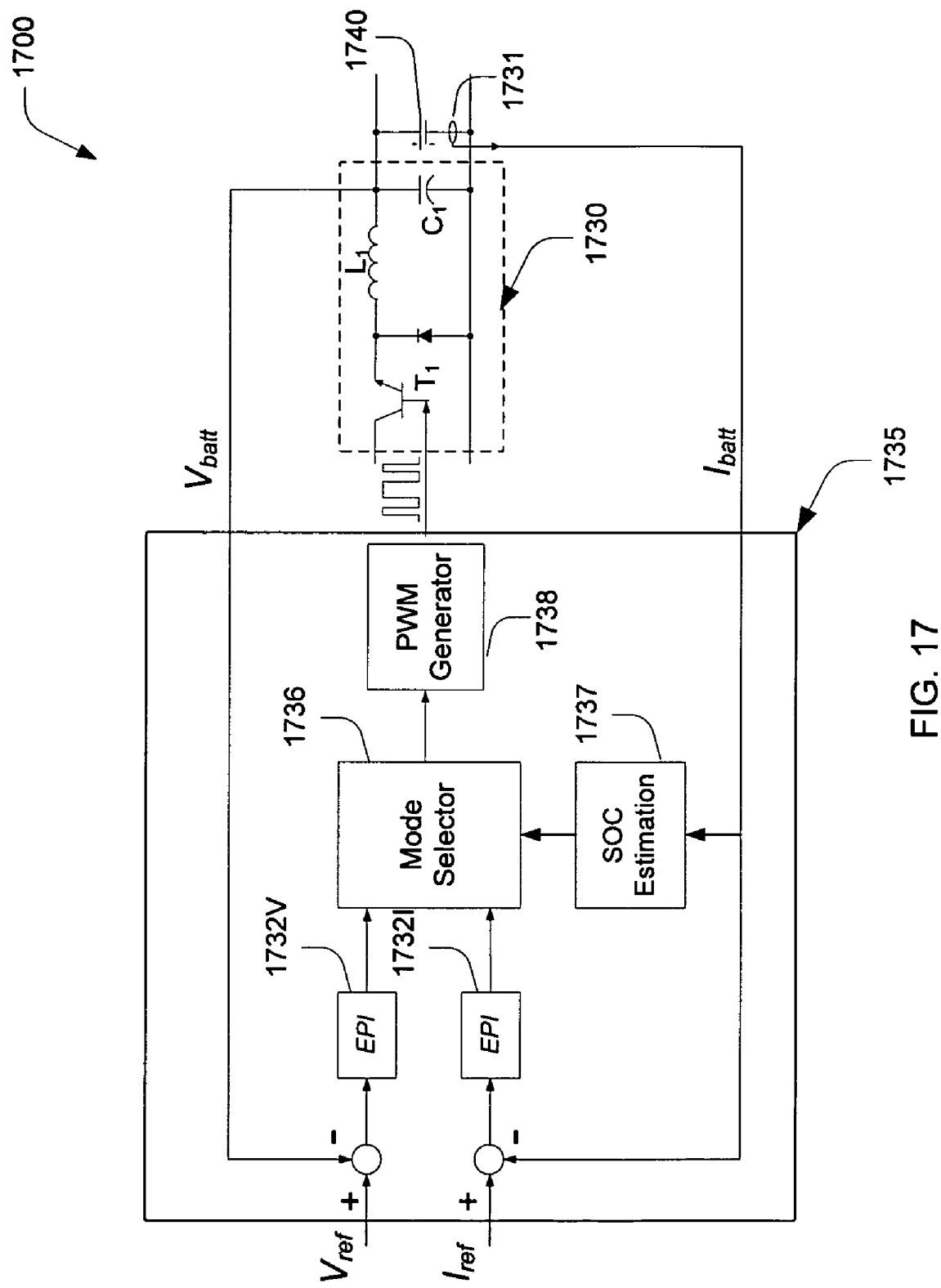
FIG. 17 is a block diagram illustrating an exemplary embodiment of a battery-charging controller according to the present invention that is suitable for use with the method of FIG. 16 and with the wind turbine systems of FIGS. 8 and 9.

Referring to FIG. 17, FIG. 17 is a block diagram illustrating an exemplary embodiment of a battery-charging controller according to the present invention that is suitable for use with the method of FIG. 16. The block diagram 1700 includes battery-charging controller 1735, battery charger 1730, and battery bank 1740.

The battery charger 1430 and battery bank 1440 of FIG. 14 are suitable for use as battery charger 1730 and battery bank 1740 respectively.

The battery-charging controller 1735 determines the net current flowing in and out of the battery bank, as well as using the determined SOC. If the SOC is lower than 90%, the batteries will be under a constant voltage current; if the SOC is higher than 90%, the batteries will be charged under a constant voltage. An error-driven proportional-integral (EPI) regulator is used to produce a robust and adaptive charging control.

The battery-charging controller 1735 uses the battery voltage Vbatt and the battery current Ibatt as control variables, and it charges the batteries 1740 via battery charger 1730 in two separate stages or modes, as will be described in greater details below with reference to FIG. 18.

Battery-charging controller 1735 uses a current sensor 1731 to determine the battery current Ib in a manner which is suitable for use in step 1605 of flowchart 1600 of FIG. 16. The batter-charging controller 1735 includes two EPI controllers 1732I and 1732V for controlling current and voltage respectively, a SOC estimation module 1737, suitable for use with the SOC determination step 1605 of flowchart 1600, a mode selector module 1736 which determines which charge mode or stage to use based on the estimated SOC and the EPI controlled current and voltage, and a PWM generator 1738 which drives the charger 1730 based on the select charge mode.

Operationally, as shown on the flow chart 1600, the BMS can be divided into the following tasks: data acquisition, battery SOC determination, charging management, and safety monitoring. The battery-charging controller 1735 uses the battery voltage Vbatt and the battery current Ibatt as control variables, and it charges the batteries in two separate stages (more details below).

The SOC estimation module 1737 calculates the net current flowing in and out of the battery bank to determine its SOC. In the mode selector module 1736, if the SOC is lower than 90%, the batteries will be under a constant current or bulk charge; if the SOC is higher than 90%, the batteries will be charged under a constant voltage or float charge, as depicted in diagram 1800 of FIG. 18, which is described in greater detail below.

The error-driven proportional-integral (EPI) regulators 1732V and 1732I use the error between the battery voltage Vbatt and a voltage reference Vref, and the battery current Ibatt and a current reference Iref respectively to produce a robust and adaptive charging control.

Much research has been conducted on the dynamic modeling of lead-acid batteries. Yet the outcomes thus far have produced either complex models of little practical use or simplified models that do not reflect real-life characteristics. The complexity of lead-acid battery modeling is due to the fact that its parameters vary, depending on the operating mode (that is, charging or discharging mode), charging speeds, resistance, and battery capacities.

An embodiment of a robust and adaptive controller for the battery-charging applications suitable for use by the stand-alone wind energy system was conceived. The controller uses a simple procedure but also offers high performance capabilities. Error-driven proportional-integral (PI) control ensure these conditions.

PI control is formulated in the time domain as follows:

$$u(t) = K_P \cdot e(t) + K_I \cdot \int_{t_0}^{t} e(\tau) d\tau + u(t_0).$$

Implementation of this control algorithm is based on correctly selecting its two coefficients $K_P$ and $K_I$, which are determined by the control objects. The proportional control (P controller) causes the control value to compensate for the error of the output voltage; it does so by multiplying the proportional gain by the error between the reference value and the sampled output value. The integral control (I controller) compensates for the steady-state error.

The controller scheme proposed here includes of an error-driven proportional regulator, in which the integral part is the same as that used in a conventional PI controller. The output u(t) of the regulator is calculated by using the following formula:

$$u(t) = (|e(t)| \cdot K_P) \cdot e(t) + K_I \cdot \int_{t_0}^{t} e(\tau) d\tau + u(t_0),$$

where $K_P$ and $K_I$ are conventional PI coefficients, respectively. By introducing the system error into proportional control as a real-time tuning factor, the variable coefficient in the proportional part results in a faster transient system response.

Although the use of EPI is preferred, the alternative use of PI or other controls is contemplated and within the scope of the present invention.

Other operational aspects of the BMS, including the two-stage charging process, and the SOC estimation and calibration will be described in greater detail below.

Figure 18:
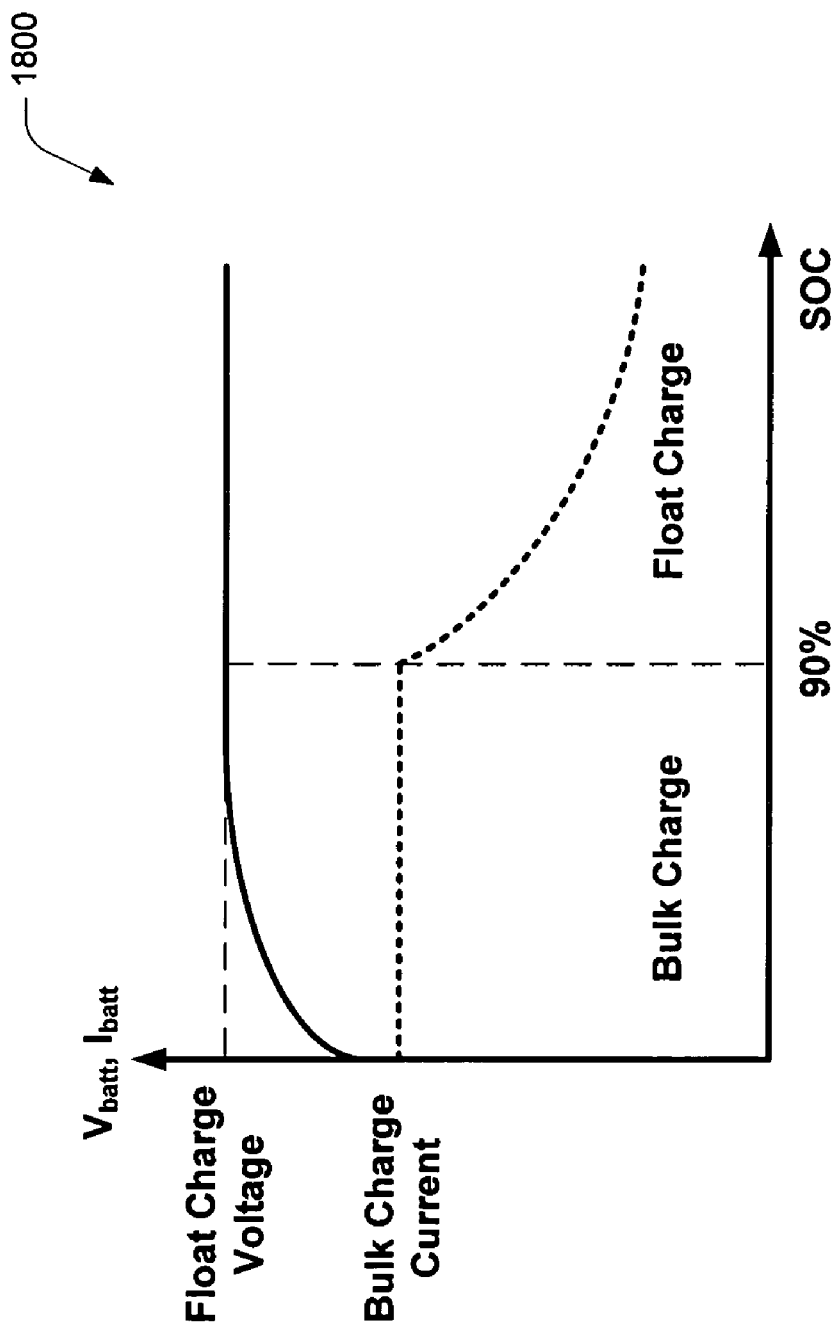
FIG. 18 is a block diagram illustrating equivalent structures and corresponding waveforms for the two modes of operation of the battery-charging controller of FIG. 17.

Referring to FIG. 18, FIG. 18 is a block diagram illustrating equivalent structures and corresponding waveforms for the two modes of operation of the battery-charging controller of FIG. 17. Batteries can be charged in several different ways. From a time to charge perspective, the preferred method is to charge at a constant voltage. This approach, however, requires the charger to provide a very large current during the initial stage, which substantially increases the volume and cost of the charger. Charging at a constant current also can be used but can lead to a dangerously high charging voltage across the batteries. This present invention took a third approach to calibration, charging the battery in two stages, referred to as the bulk charge (constant current) and the float charge (constant voltage), utilizing set points recommended by the battery manufacturer.

Under the two-stage charging scheme 1800, the bulk charge provides the battery with sufficient charging current to return the battery to 90% SOC. The float charge represents the voltage setting that thereafter will maintain the battery at full charge. As these terms suggest, most energy transfer occurs during the constant, high-current, bulk-charging stage.

Because the float charge is restricted to using relatively low battery currents, the ability to reduce the charging time depends on delivering as much current as possible during the initial, bulk-charging period. Parameters that ultimately limit the bulk-charging current include the current capacity of the wind turbine generator, the capacity of the charger, and the thermal and chemical limitations of the batteries.

Figure 19:
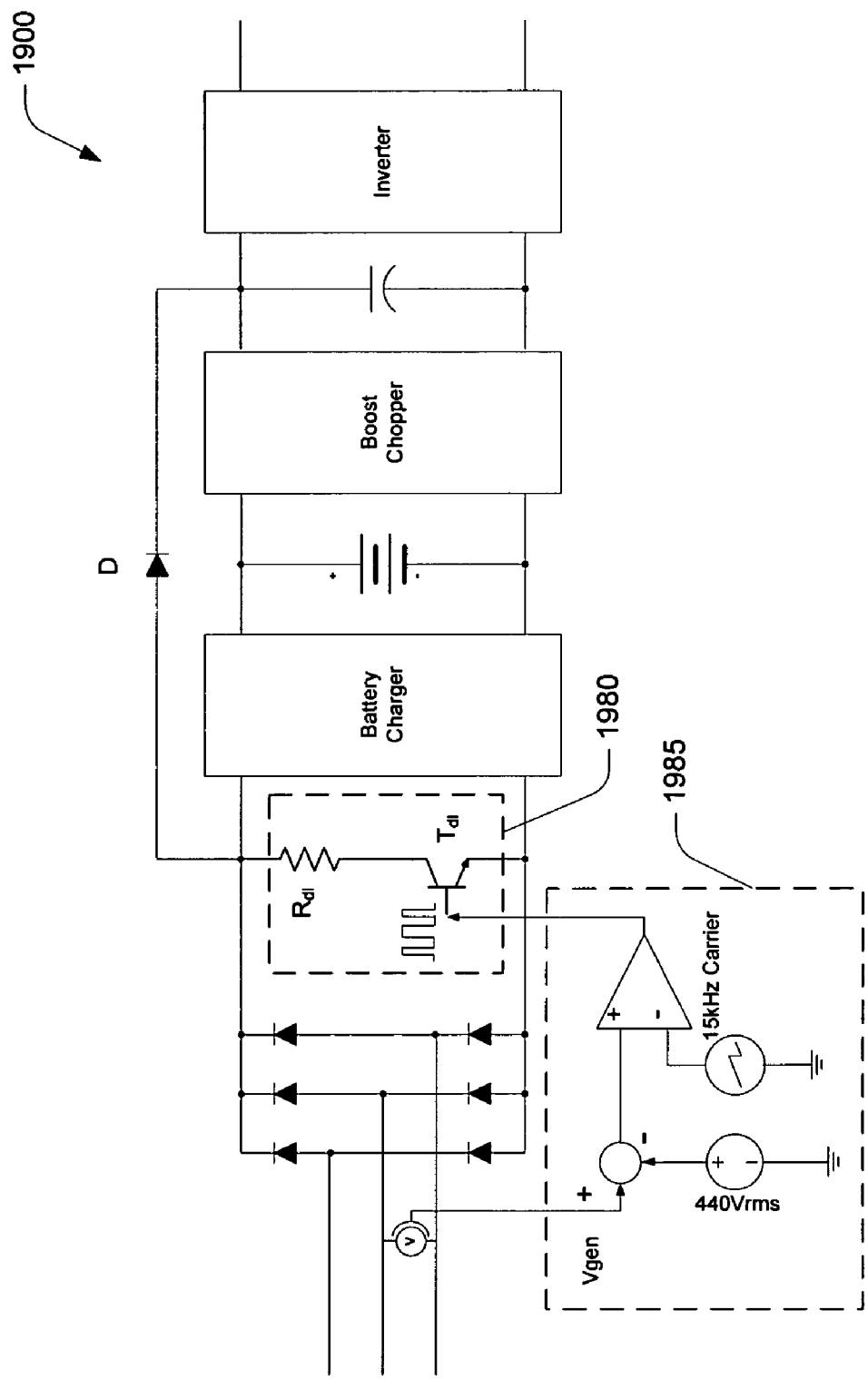
FIG. 19 is a block diagram illustrating an exemplary embodiment of a dump-load controller according to the present invention that is suitable for use with the wind turbine system of FIGS. 8 and 9.

Referring to FIG. 19, FIG. 19 is a block diagram illustrating an exemplary embodiment of a dump-load controller according to the present invention.

Wind turbines operate at variable speeds and produce power at variable voltages and frequencies. When the input power from the generator exceeds power demands of both the load and the battery charging, the frequency and amplitude of the generator's output voltage tend to increase. A regulated dump load is used to prevent a wind turbine from over speed.

The PWM-controlled dump load 1980 for the stand-alone system 1900 includes a resistor $R_{dl}$ and an insulated gate bipolar transistor (IGBT) transistor $T_{dl}$. The dump load controller 1985 monitors the generator voltage $V_{gen}$. When $V_{gen}$ is higher than 440V, the PWM generator will trigger the IGBT $T_{dl}$, and excess power will be released as heat by the resistive load $R_{dl}$.

The dissipated power can be adjusted by modulating the pulse width of the IGBT trigger signal. From the standpoint of the wind turbine generator, the PWM-controlled dump load is equivalent to a variable resistive load. By using the PWM controller, the power absorbed by the dump load can be regulated, and the wind turbine speed can be stabilized.

Figure 20:
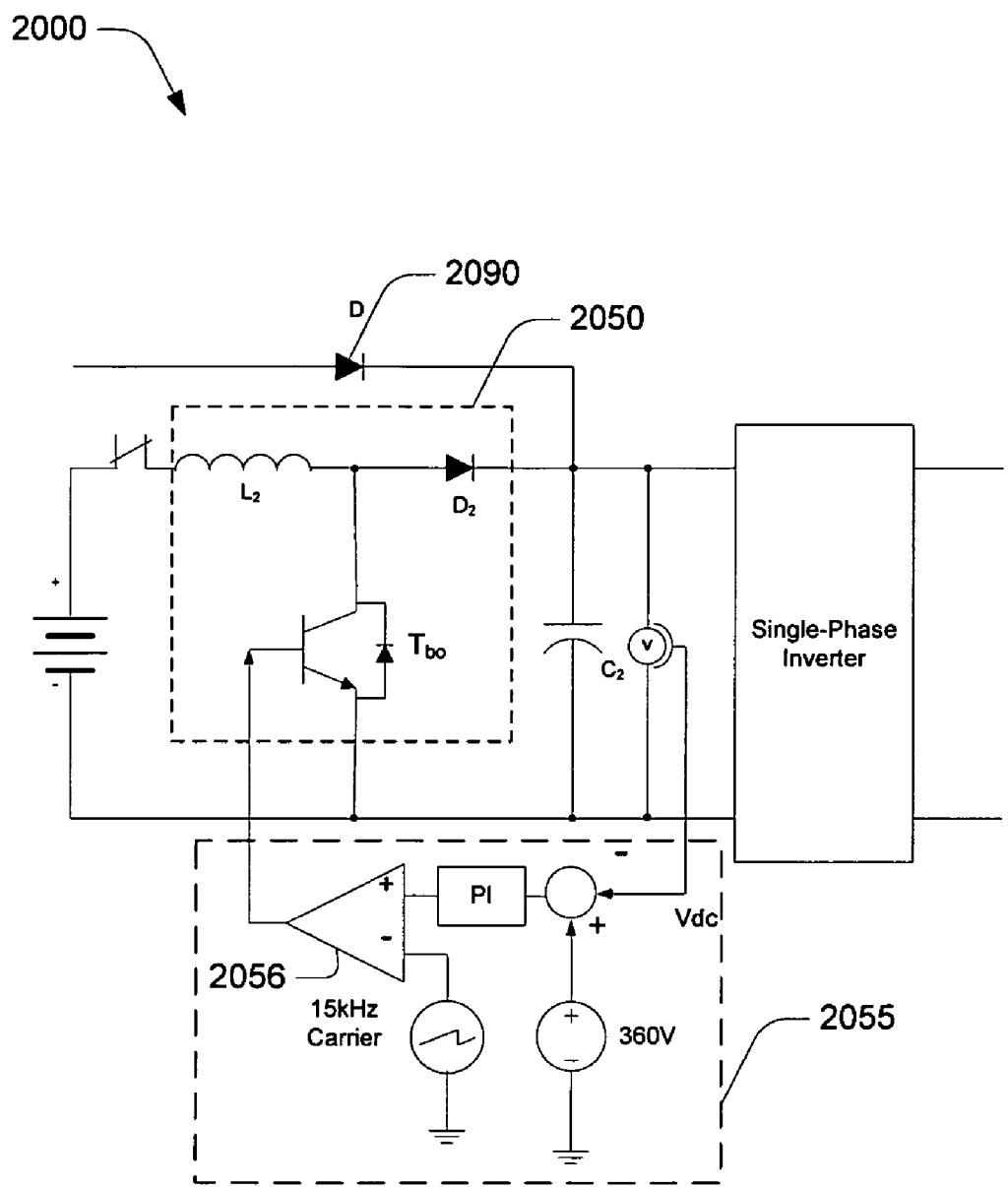
FIG. 20 is a block diagram illustrating an exemplary embodiment of a boost-chopper controller according to the present invention that is suitable for use with the wind turbine system of FIGS. 8 and 9.

Referring to FIG. 20, FIG. 20 is a block diagram illustrating an exemplary embodiment of a boost-chopper controller according to the present invention. The boost chopper 2050 completely shuts off when the voltage passing through the bypass diode D 2090 exceeds 360V. The boost chopper controller 2055 is realized by using a conventional PI controller. To ensure that the boost chopper operates between 87% and 0% of the duty cycles in response to the different modes of operation, the boost chopper controller 2055 follows a switching logic, depending on its output voltage. If the output voltage of the boost chopper 2055 exceeds 360V, its controller bypasses the PI controller and sends a zero directly to the PWM generator 2056 to disable the boost chopper 2050. If the boost chopper's 2055 output voltage is less than 360V, the PI controller calculates the pulse width to the IGBT $T_{bo}$ by using the error value, which is equal to Vref−Vdc, where Vref is 360V in system 2000.

Figure 21:
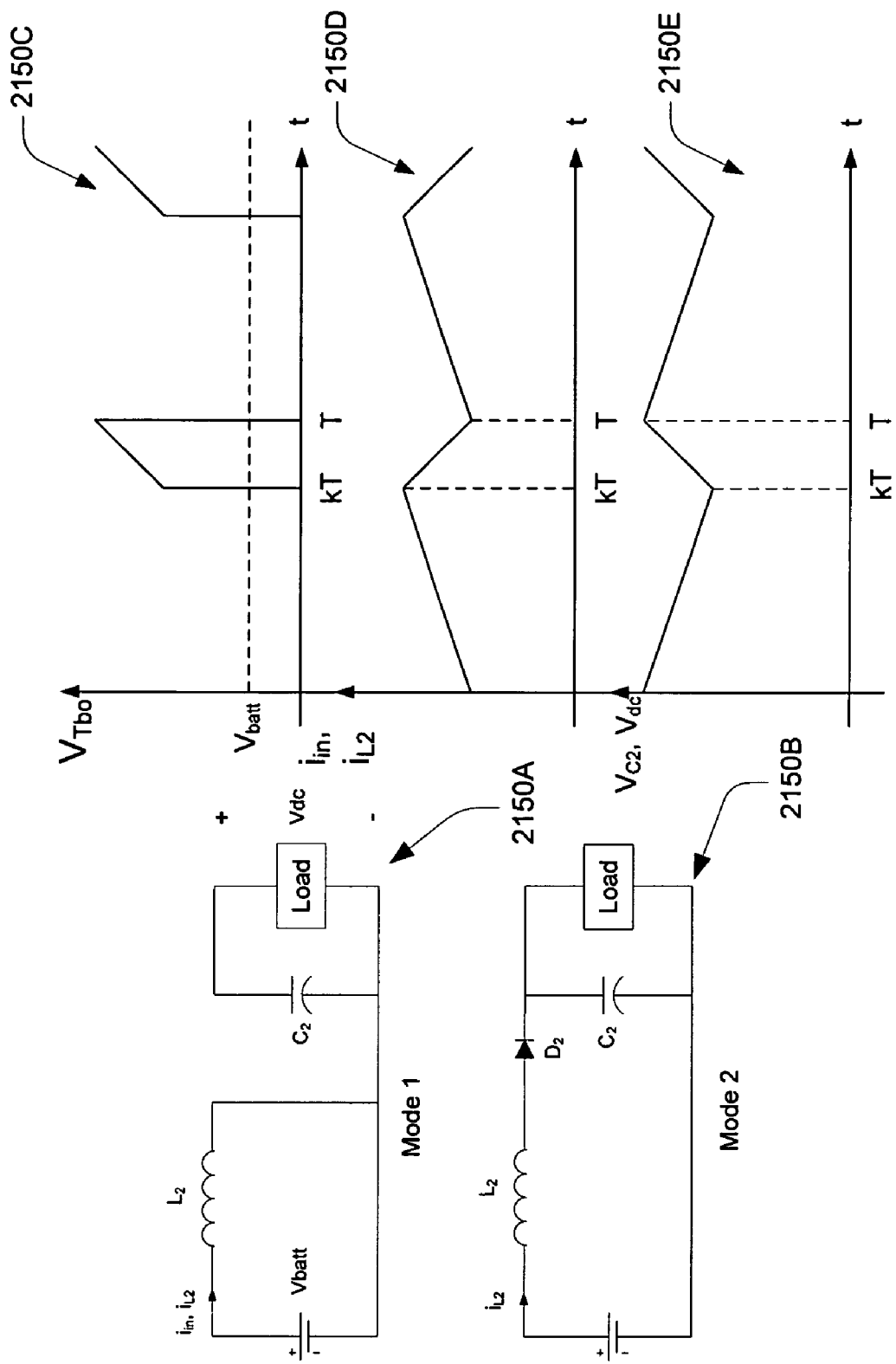
FIG. 21 is a block diagram illustrating equivalent structures and corresponding waveforms for the two modes of operation of the boost chopper of FIG. 20.

Referring to FIG. 21, FIG. 21 is a block diagram illustrating equivalent structures and corresponding waveforms for the two modes of operation of the boost chopper of FIG. 20. The circuit operation for the boost chopper 2050 of system 2000 is divided into two modes. Mode 1 2150A begins when the transistor $T_{bo}$ is on; the source is shorted across the inductor, and the current builds up in the inductor due to the positive inductor voltage, $V_{L2}=V_{batt}$. When the transistor is off, the circuit operation switches to Mode 2 2150B. The voltage across $L_2$ reverses and is added to the input voltage ($V_{dc}-V_{batt}$), causing the output voltage to become greater than the input voltage. Diode $D_2$ prevents the capacitor from discharging through the source or through the shorted switch when closed. The waveforms 2150C, 2150D and 2150E further illustrate the operation of the boost chopper in both operating modes.

As occurs with the buck choppers during a steady-state operation, the total volt-seconds applied to the inductor $L_2$ over a full switching period is zero:

$$\int_0^T v_L(t) = V_{batt} \cdot kT + (V_{batt} - V_{dc})(1-k)T = 0.$$

Therefore $$V_{batt} \cdot k \cdot T = (V_{dc} - V_{batt})(1-k)T$$

and $$\frac{V_{dc}}{V_{batt}} = \frac{1}{1-k},$$

where k is the switching duty cycle, and $V_{batt}$ is the battery voltage.

The above equation shows that the output voltage increases as k increases and that, in the ideal scenario, it tends to infinity as k tends to 1. Theoretically, then, the boost chopper can produce an output voltage that always will be greater than the input voltage, no matter what the value of the input voltage. To convert the battery output voltage (48V) to a much higher dc-link voltage (360V), the ratio of the duty cycle k must have a value of up to 87%.

Figure 22:
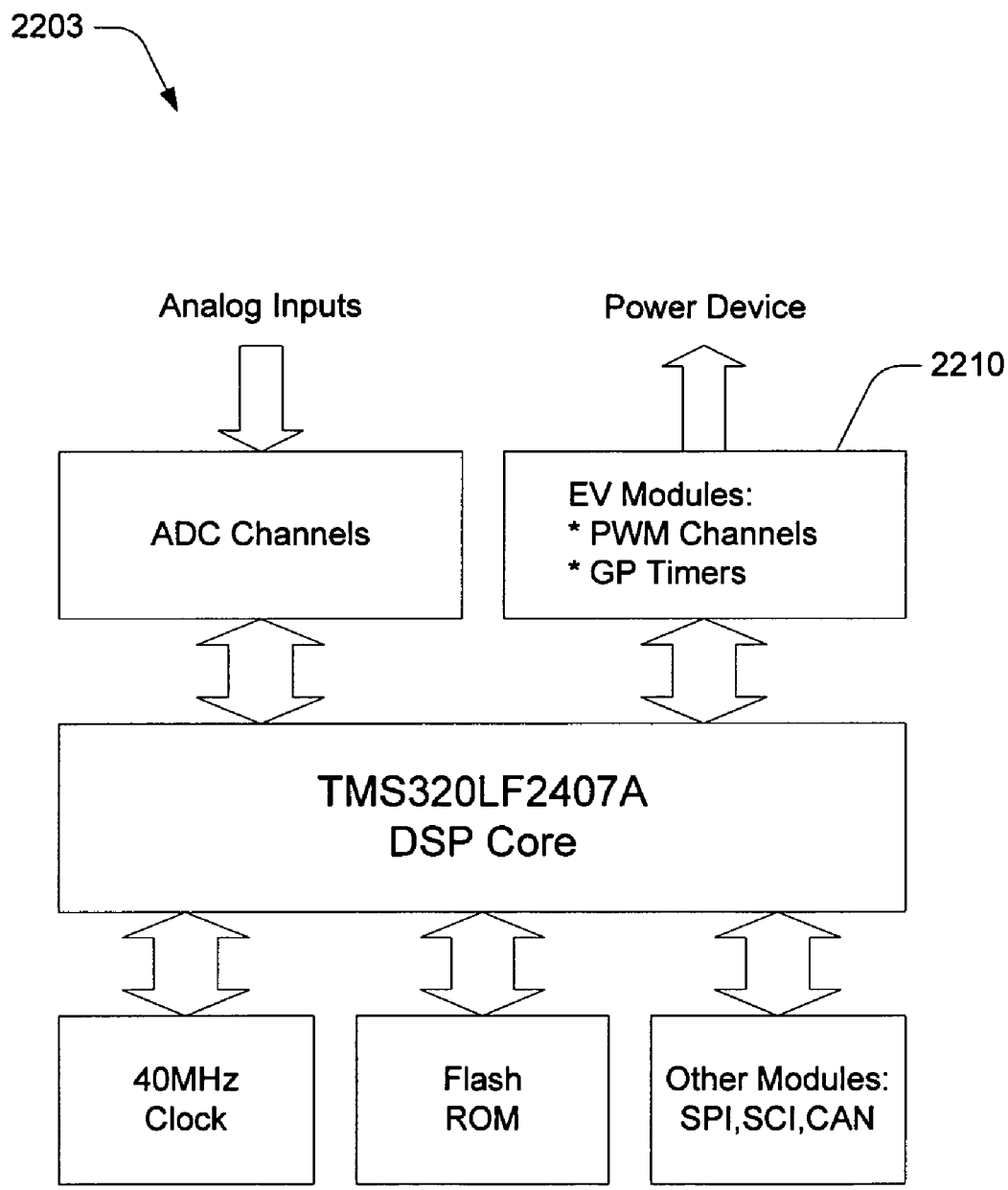
FIG. 22 is a block diagram of a DSP microcontroller suitable for use in the wind turbine system of FIG. 9.

Referring to FIG. 22, FIG. 22 is a block diagram of a DSP microcontroller suitable for use in the wind turbine system of FIG. 9.

Low-cost, high-performance DSP controllers with integrated peripherals such as A/D converters and pulse width modulators (PWMs) represent an important new tool in the field of power supply design, particularly in the control of power conversion functions. Advantages of these DSPs include low power dissipation, immunity to analog component variations, compatibility with digital systems, and the ability to implement sophisticated control schemes.

The TMS320LF2407A DSP 2203 from Texas Instruments™ includes a set of PWMs 2210 that are used to generate various trigger signals. Further details of how to generate PWM signals are provided in reference to FIG. 25.

Figure 23:
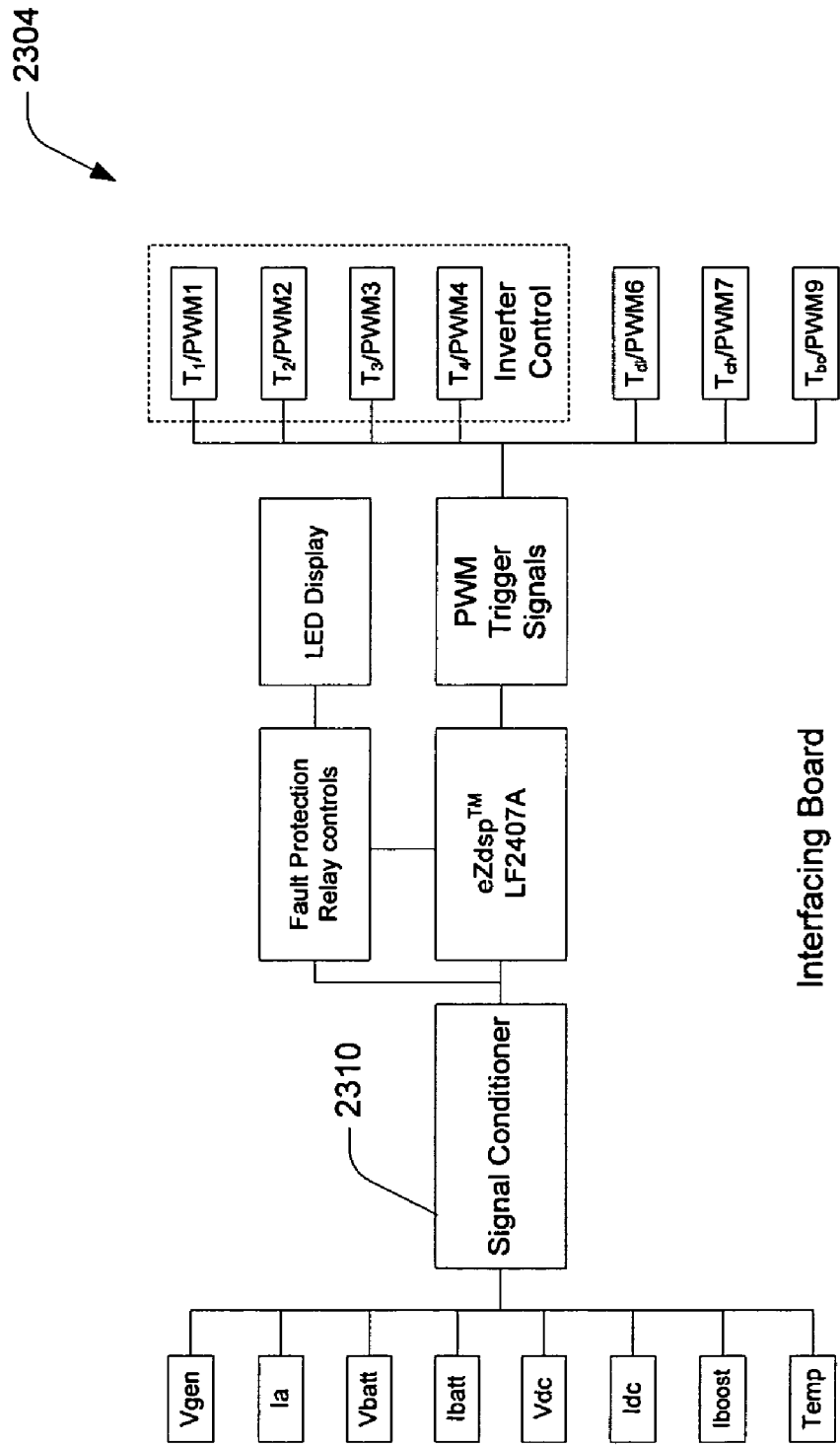
FIG. 23 is a block diagram of an interfacing board suitable for use in the wind turbine system of FIG. 9.

Referring to FIG. 23, FIG. 23 is a block diagram of an interfacing board suitable for use in the wind turbine system of FIG. 9.

The eZdsp™ LF2407A from Spectrum Digital Inc. is an integrated interfacing board module 2304 that provides an excellent platform to develop and run software for the TMS320LF2407A processor. It allows full-speed verification of the LF2407A code. The eZdsp board contains 64K words of onboard program/data random access memory (RAM) and can solve a variety of problems. It includes three expansion connectors to accommodate any necessary evaluation circuitry that does not appear in the as-shipped configuration, as well as appropriate signal conditioner 2310. It contains a C2000 Tools Code Composer driver to simplify code development and shorten debugging time. In addition, its onboard JTAG connector provides an interface to emulators, and operates with other debuggers to facilitate assembly language and C language debugging.

Figure 24:
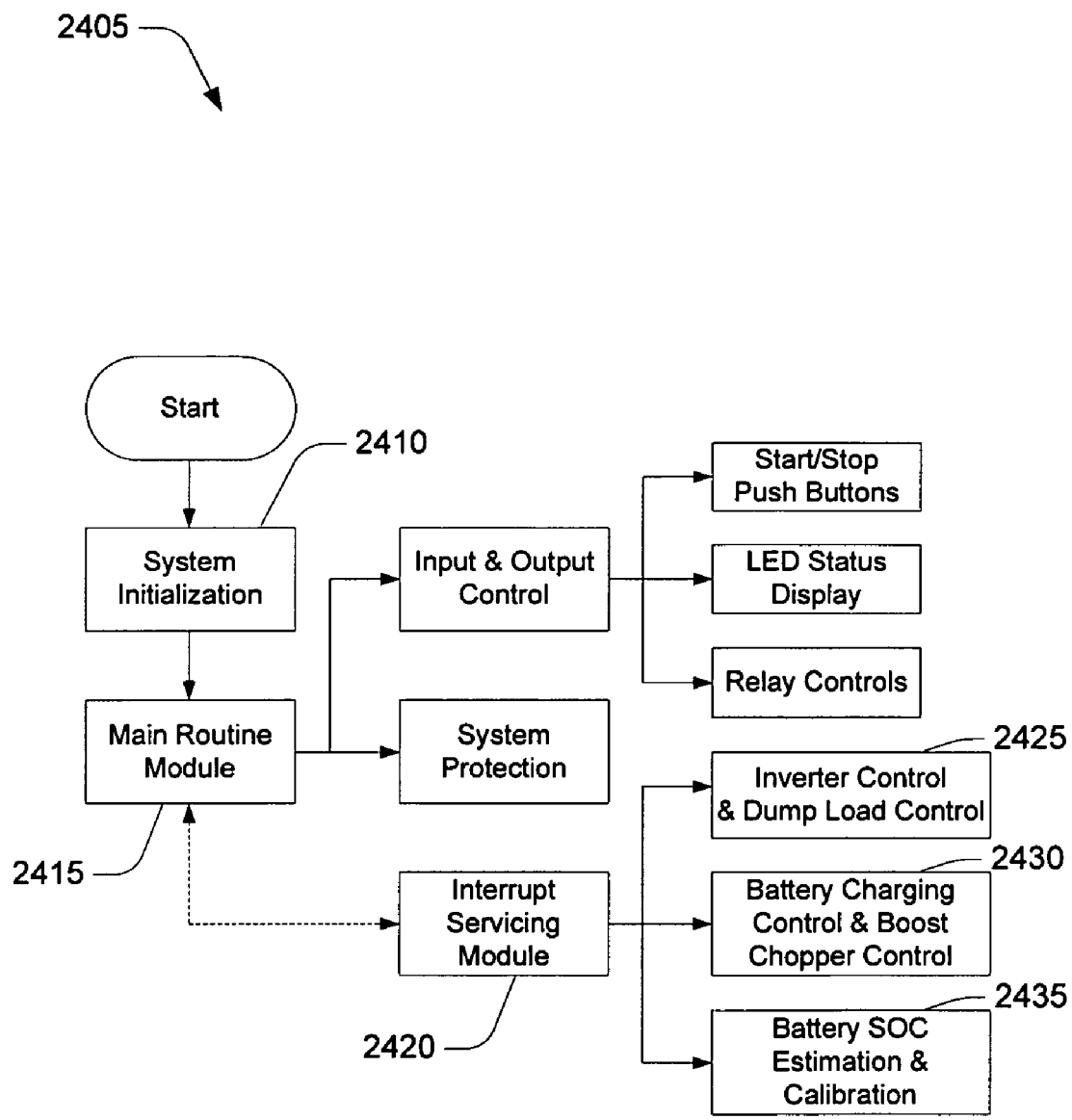
FIG. 24 is a block diagram of a preferred exemplary embodiment of an integrated control module according to the present invention that is suitable for integrating and controlling components of the wind turbine system of FIG. 9.

Referring to FIG. 24, FIG. 24 is a block diagram of a preferred exemplary embodiment of an integrated control module according to the present invention that is suitable for integrating and controlling components of the wind turbine system of FIG. 9.

A software program embodying the integrated control module 2405 for the DSP was written in assembly language, and the code was developed by the C2000 Tools Code Composer. The program includes three modules: the system initialization module 2410, the main loop module 2415, and the interrupt servicing module 2420.

When the processor is first reset, the initialization module 2410 performs the following tasks:

DSP setup: core, watchdog, clocks, analog-to-digital converter (ADC), serial communications interface (SCI), general purpose input/output (IO), event manager;
initialization of variables: default values; and
interrupt source selection and enabling.

After the program finishes the tasks in the system initialization module 2410, it enters the main loop module 2415. The main loop module 2415 cyclically performs the following tasks:

input and output control: checks the status of start/stop push buttons, updates the LED display and control relays; and
system protection: monitors the generator voltage, dc-link voltage and current, inverter output current, boost chopper current, and heat sink temperature for system protection.

The control variables are sensed by the on-chip A/D converter (ADC). Appropriate external conditioning circuits 2310 of FIG. 23 are used for each channel, in order to bring the variables within range of the 10-bit ADC. If the sampling frequency is too low, the protection routine cannot adequately safeguard against faults. The A/D sampling frequency is therefore set to 60 kHz to enable software protection functions to operate.

The program includes three interrupts. They are designed to manage the inverter and dump load control 2425, the battery-charging and boost chopper control 2430, and the battery SOC estimation and calibration control 2435. These features are listed in order of interrupt source priority. The order of interrupt source priority is determined by the nature of the operating system. Because the wind turbine generator and the inverter indisputably are the most important components, the dump load control and the inverter control algorithms reflect those parts as having top priority. GP Timer 1 is applied to the PWM control functions for both components.

Figure 25:
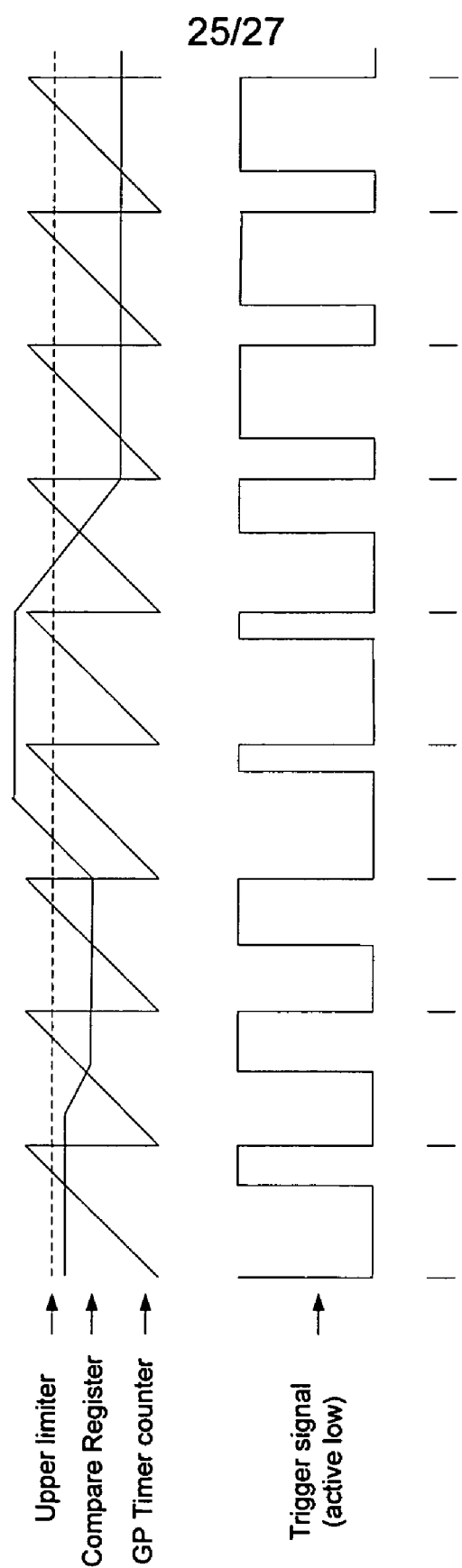
FIG. 25 illustrates how the integrated control module of FIG. 24 generates PMW pulses.

Referring to FIG. 25, FIG. 25 illustrates how the integrated control module of FIG. 24 generates PMW pulses. The upper limit is set for IGBT protection purposes, which is particularly important for the boost chopper operation.

To generate a PWM signal, a general-purpose (GP) Timer is needed to repeat a counting period that is the same as the PWM period. A compare register (CMPR) is used to hold the modulating values. The value of the compare register is constantly compared with the value of the GP Timer counter. When the values match, a transition (from low to high, or high to low) happens on the associated output. When a second match is made between the values, or when the end of a timer period is reached, another transition (from high to low, or low to high) happens on the associated output. In this way, an output pulse is generated whose on (or off) duration is proportional to the value in the compare register. This process is repeated for each timer period with different (modulating) values in the compare register. As a result, a PWM signal is generated at the associated output. The PWM waveform generation is processed in the Event Manager (EV) Modules. The twelve PWMs in EV Module A (EVA) and EV Module B (EVB) are configured into six pairs, with three pairs in each module. PWMs in EV Module A use GP Timer 1; PWMs in EV Module B use GP Timer 3. The clock cycle of the LF2407A chip is 40 MHz.

As mentioned above, the PWM signals are generated by comparing the GP Timer counters with the compare registers. The software program calculates the required duty cycle, which is stored in compare registers CMPR1 and CMPR2. PWM1 and PWM2 represent outputs of the comparison between the GP Timer counter and CMPR1; PWM3 and PWM4 represent outputs of the comparison between the GP Timer counter and CMPR2. These four PWM signals in turn represent switch signals for the four IGBTs of the inverter. PWM6 generates the output trigger signal for the dump load controller. Because the inverter control and the dump load control share a single GP Timer, they both work at the same switching frequency.

GP Timer 3 generates the PWM signals that control the battery charger and the boost chopper. The switching frequency is set at 15 kHz. The battery current Ibatt, the battery-charging voltage Vbatt, and the input dc-link voltage to the inverter Vdc all are sensed as control variables. The control algorithm computes the required pulse widths to the corresponding PWM outputs, those being PWM7 for the battery charger and PWM9 for the boost chopper.

Figure 26:
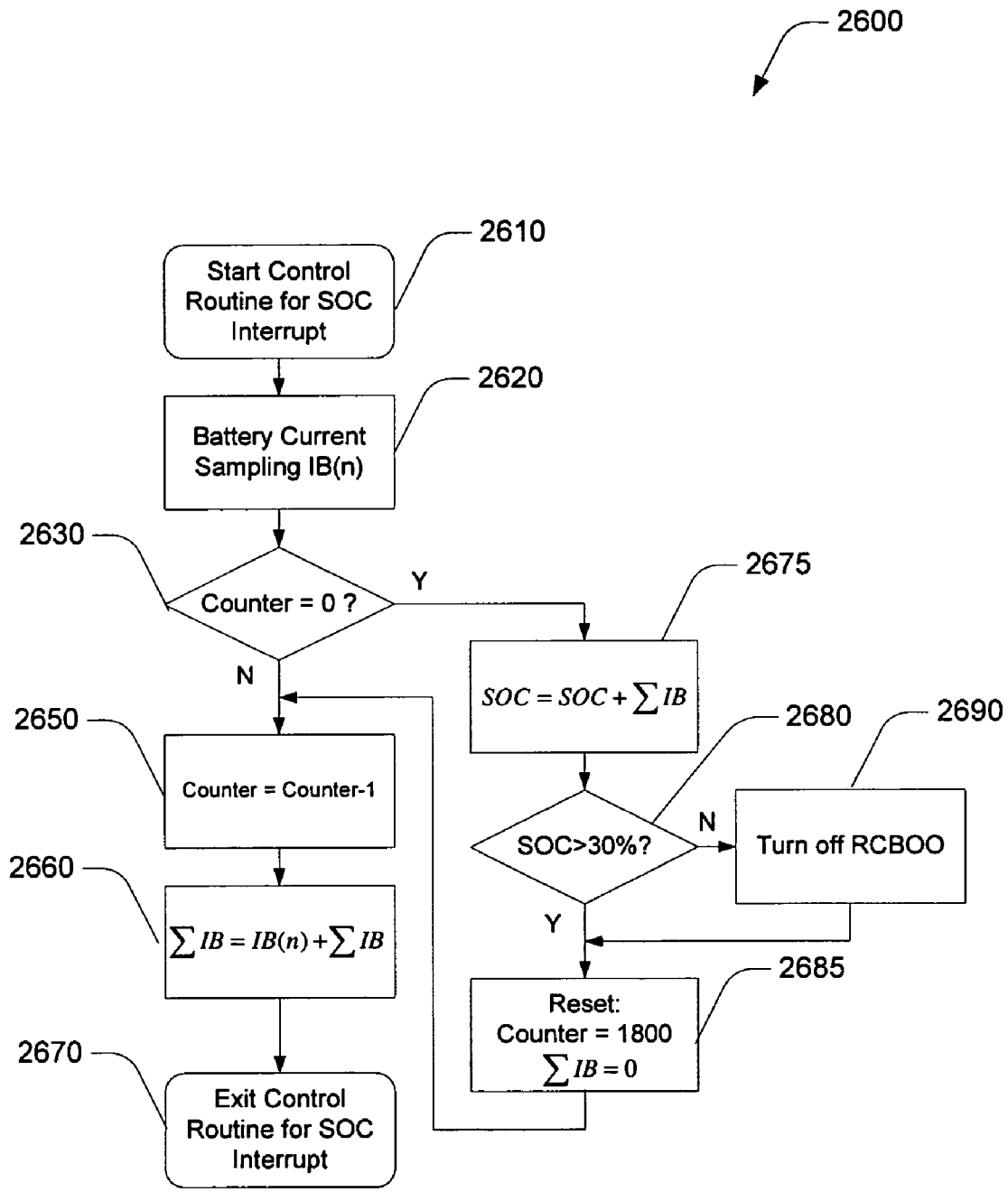
FIG. 26 is a flowchart illustrating an exemplary embodiment of a SOC determination method suitable for use to carry out steps in the battery management method of FIG. 16 and suitable for use as an interrupt service routine in the integrated control module of FIG. 24 according to the present invention.

Referring to FIG. 26, FIG. 26 is a flowchart illustrating an exemplary embodiment of a SOC determination method suitable for use to carry out steps in the battery management method of FIG. 16 and suitable for use as an interrupt service routine in the integrated control module of FIG. 24 according to the present invention.

During system initialization 2410 of FIG. 24, a Counter is set to a pre-determined number of samples, for example 1800. Each SOC interrupt causes the servicing routine to start at step 2610. The DSP program samples the battery current IB(n) at step 2620 and adds it to ΣIB at step 2660. After 1800 IBs are sampled and accumulated to ΣIB, which is tracked by decrementing Counter at step 2650 and comparing it to zero at step 2630, the value of ΣIB goes to update the value of SOC at step 2675, after which the Counter and ΣIB are reset to initial values for next round of accumulation at step 2685. To protect the battery from over-discharging, a relay such as in element 999 of FIG. 9, is turned off using RCBOO at step 2690 if it is determined that the SOC is below a minimal charge set point, for example of 30%, at step 2680.

State-of-charge (SOC) refers to the level of charge that a battery retains: a 100% SOC indicates a fully charged battery, and a 0% SOC indicates a dead battery. Accurately determining the SOC for a battery over time is crucial to the implementation of battery-charging control strategies.

The following equation is used to calculate the SOC:

$$SOC_{t+1} = SOC_t + \frac{\sum_t I_B(t) \times \Delta t}{C}$$

where
$SOC_t$ is the SOC in the previous calculation period,
$SOC_{t+1}$ is the instantaneous SOC,
$I_B(t)$ is the battery current,
$\Delta t$ is the time interval between calculations, and
C is the capacity of the battery.

The sign for $I_B(t)$ is either positive or negative, depending on whether the net current is flowing in or out of the battery.

An embodiment of this method was adapted to Surrette T12 136 lead-acid batteries by including a charging efficiency factor to improve calculation accuracy. The embodiment was conceived after experimental tests revealed that the actual SOC consistently read lower than the SOC calculated by applying a charging current, due to heat generation and battery gassing. The charging efficiency factor can improve accuracy of the SOC estimation over several periods of operation, and will be described in greater detail further below.

Longer periods of operation can result in even larger accumulated errors in SOC estimates. The main sources of error are losses in the batteries, numerical scaling errors in the DSP, and current sensor error. A feasible solution for accurately measuring the SOC over long intervals is to apply periodic calibration. In the battery-charging control function, we can force a recalibration if necessary by disconnecting the boost chopper, which represents the pathway from the batteries to the load. When the batteries are overdischarged and SOC is less than 30%, the boost chopper is disconnected, and the batteries will fully recharge to 120% SOC before reconnecting to the boost chopper. Meanwhile, the SOC is reset to 100% for calibration. It is imperative that batteries have 105% to 120% of their charge replaced, because the capacity of individual battery plates varies slightly, and it is necessary to bring each plate into a fully charged condition.

In an alternate embodiment, calibrating the battery SOC is to use a hydrometer, which measures the specific gravity (SG) of the battery acid or electrolyte solution. Specific gravity readings provide the most accurate measure of a battery's SOC. If a battery is 50% charged, it will give an SG reading of 1.200, regardless of whether the battery is on charge, being discharged, or being stored. (This is not the case for voltage readings.)

Table 5 shows the SOC for various specific gravities at 25° C. By using this table to obtain the true SOC of the batteries, we can reset the initial SOC value in the DSP program. It is important to conduct this manual calibration each time before restarting the system.

TABLE 5

Battery state-of-charge vs. specific gravity
(courtesy of Surrette Battery Company Limited).

| State-of-Charge | Specific Gravity |
|---|---|
| 100% | 1.255-1.275 |
| 75% | 1.215-1.235 |
| 50% | 1.180-1.200 |
| 25% | 1.155-1.165 |
| 0% | 1.110-1.130 |

The above equation is equivalent to:

$$SOC_{t+1} \times C = SOC_t \times C + \Sigma_t I_B(t) \times \Delta t,$$

in which $\Delta t$ (the sampling period of $I_B$) is set at 0.2 seconds, and $\Sigma_t I_B(t)$ is the sum of 1800 values of $I_B$. The number of $I_B$ values and the sampling period are determined by considering the trade-off between the calculation accuracy and the bit length limitation.

The initial calculation of SOC for the battery bank is determined by the following equation.

$$SOC_1 \times C = C + \sum_t I_B(t) \times \left(\frac{0.2}{3600}\right) = C + \frac{\sum_t I_B}{18000}$$

At the start of each test, the batteries must be fully charged according to the manufacturer's specifications. The initial value $SOC_0$ is set to 100%, and C is the base value. The sampled current value $I_B$ first is right-shifted by 4 bits and prepared for the calculation of $\Sigma_t I_B(t)$. A right-shift of 4 bits lies within the range of reasonable precision. $\Sigma_t I_B(t)$ is right-shifted by 10 bits and added to C to determine the $SOC_1$. The calculated SOC, is then stored in the data memory for the next calculation. In this way, the SOC can be calculated within a satisfactory range of accuracy. Nonetheless, some accumulative and numerical errors remain.

As mentioned earlier, the SOC should be recalibrated whenever its value drops below 30%. Under those circumstances, the relay RCBOO is activated to disconnect the boost chopper, allowing the battery to become fully charged to 120%. Then the program in the main routine module resets the SOC to 100% and reconnects the boost chopper.

Figure 27:
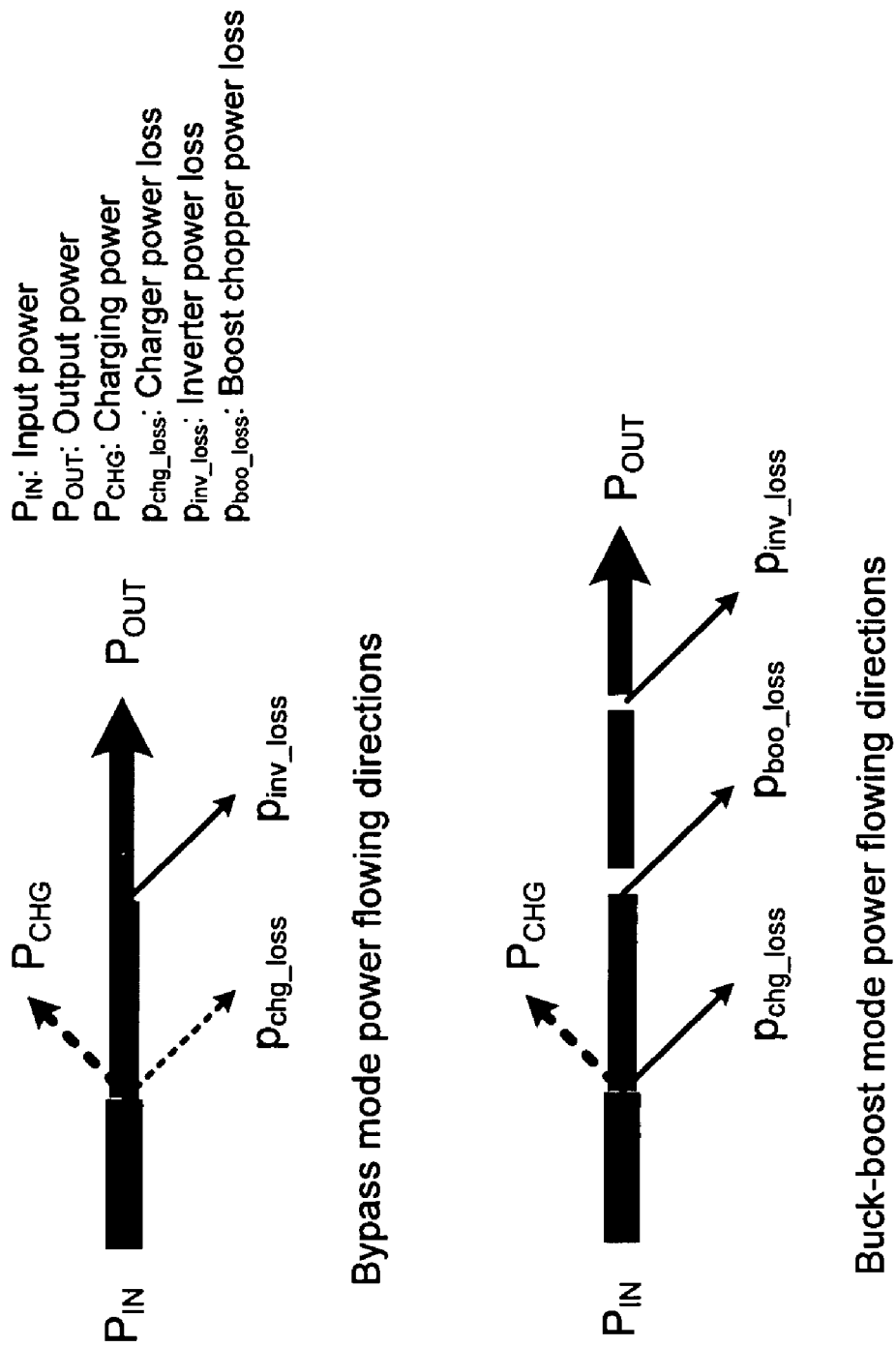
FIG. 27 illustrates power flow in bypass mode and buck-boost mode of the wind turbine system of FIG. 9.

Referring to FIG. 27, FIG. 27 illustrates power flow in bypass mode and buck-boost mode of the wind turbine system of FIG. 9.

FIG. 27 indicates the power flowing directions in different operation modes. The dotted lines mean that certain power consumptions are dependent on the battery charging states. For example, if the batteries are fully charged, both the charging power PCHG and the charger power loss pchg_loss are supposed to be zero in bypass mode.

The input power and output power of the entire system shown in Table 6 is indicative of what may be measured by a power quality analyzer. Similarly, the battery charging voltage and charging current of Table 6 are indicative of what may be measured by multimeters to get the charging power. The values are exemplary only.

TABLE 6

Quantitative comparison of the system operation efficiencies in different modes.

| | Input Voltage (line-line rms) | | | | |
|---|---|---|---|---|---|
| | 100 V | 160 V | 200 V | 270 V | 300 V |
| Operation Mode | Buck-boost | | | Bypass | |
| Input Power (kVA) | 4.10 | 4.22 | 3.93 | 3.79 | 4.01 |
| Output Power (kVA) | 2.62 | 2.58 | 2.64 | 2.79 | 3.01 |
| Battery Charging Voltage (V) | 53.1 | 52.9 | 53.3 | 53.2 | 53.5 |
| Battery Charging Current (A) | 3.2 | 3.5 | 4.1 | 4.8 | 5.2 |
| Efficiency (%) | 68.1 | 65.6 | 72.8 | 80.3 | 81.9 |
| | | Low | | | High |

Although the focus has been on wind renewable energy systems, systems with diesel gensets, photovoltaic arrays, and/or electrolyzers or which use other renewable energy sources instead of wind, or in a wind-hybrid system are contemplated by the present invention. A person having ordinary skill in the art may adapt the embodiments of the present invention to operate with renewable energy systems in view of the present specification, and any such adaptation falls within the scope of the present invention, as the present invention enables the integrated control and stand-alone use of a renewable energy source despite variations in availability of the source.

In alternative embodiments, it is contemplated to utilize a diesel genset, power from an electrical grid, or another complementary renewable energy source such as an electrolyzer, photovoltaic array for example, instead of the battery bank in order to drive the load in the event that the wind turbine cannot generate sufficient power to drive the load.

In alternative embodiments, it is contemplated to utilize another complementary renewable energy source such as an electrolyzer, photovoltaic array instead of the wind turbine generator.

As used in the claims, the availability of a renewable energy source is a synonym for the energy that a renewable energy source can provide. For example, in the case of a wind energy source, availability corresponds to wind speed, whereas in the case of a solar energy source, availability corresponds to sunshine.

In alternative embodiments, it is contemplated to substitute the battery bank with any one of a number of power storage systems, such as for example an electrolyzer coupled to a genset or a photovoltaic array, or any other suitable power storage system.

In alternative embodiments, it is contemplated to substitute the battery with any one of a number of power sources, such as for example a genset, a photovoltaic array, or grid power.

In alternative embodiments, it is contemplated to substitute the DSP-based controller with any one of several technologies used alone or in combination, such as programmable logical controllers (PLCs), field programmable gate arrays (FPGAs), application specific integrated circuits (ASICs), and DSP-based microcontrollers, as it is contemplated that each could potentially be used to integrate the control of stand-alone wind energy systems in view of the present specification. DSPs are preferred however, as these have been used extensively in the fields of motor control, uninterruptible power supplies (UPS), and motion control applications. When compared with traditional analog control, DSP controllers offer many distinct advantages. These include a standard control hardware design for multiple platforms, better noise immunity, easy implementation of sophisticated control algorithms, and a single-chip solution for both control and communication functions.

The above-described embodiments of the present invention are intended to be examples only. Those of skill in the art may effect alterations, modifications and variations to the particular embodiments without departing from the scope of the invention, which is set forth in the claims.

What is claimed is:

1. A renewable energy power conversion apparatus suitable for generating electrical power at an output to drive a load using power obtained from a renewable energy source, the electrical power at the output of the apparatus provided at a substantially pre-determined output voltage level despite variations in the availability of the renewable energy source, the apparatus comprising:
   a. a power generator having a generator output, said power generator adapted to convert energy from the renewable energy source into a generated power at a generated voltage level that varies subject to the availability of the renewable energy source, the power generator rated for a pre-determined nominal generator voltage level;
   b. a buck-boost power flow channel coupling the generator output of said power generator to the output of the apparatus, said buck-boost power flow channel adapted to provide a first portion of the output power at the output of the apparatus by regulating a first portion of the generated power to a regulated voltage level and by boosting the first portion of the generated power to a voltage level which is substantially compatible with the pre-determined output voltage level; and
   c. a bypass power flow channel coupling the generator output of said power generator to the output of the apparatus, said bypass power flow channel adapted to operate in parallel with said buck-boost power flow channel to provide a second portion of the output power by passing the second portion of the generated power directly to the output of the apparatus at a voltage level which is substantially equal to the generated voltage level;

wherein most of the generated power flows from the output of said power generator to the output of the apparatus via said bypass power flow channel when the generated voltage level rises substantially above the nominal generator voltage level.

2. The apparatus as recited in claim 1, wherein the renewable energy source is a wind energy source, and wherein said power generator is a wind turbine power generator.

3. The apparatus as recited in claim 1, wherein most of the generated power flows from the output of said power generator to the output of the apparatus via said buck-boost power flow channel when the generated voltage level falls substantially below the nominal generator voltage.

4. The apparatus as recited in claim 1, further comprising a power storage system for storing a third portion of the output power, wherein the third portion of the generated power is stored in said power storage system when the generated power substantially exceeds the power requirements of the load, and wherein said power storage system provides the third portion of the output power when the power requirements of the load substantially exceed the generated power.

5. The apparatus as recited in claim 4, wherein the power storage system is a battery-bank.

6. The apparatus as recited in claim 4, further comprising a dump-load for disposing of a fourth portion of the generated power when said battery-bank is at a full state-of-charge and the generated power substantially exceeds the power requirements of the load.

7. The apparatus as recited in claim 4, further comprising a boost chopper coupled to said power storage system to receive the fourth portion of generated power, said boost chopper further coupled to the output of the apparatus to condition the fourth portion of generated power to a voltage level that is compatible with the output voltage.

8. The apparatus as recited in claim 4, wherein the power storage system is an electrolyzer coupled to a genset.

9. The apparatus as recited in claim 1, further comprising a boost power source, wherein said boost power source provides a third portion of the output power when the power requirements of the load substantially exceed the generated power.

10. The apparatus as recited in claim 9, wherein the boost power source is selected from the group comprising: battery-bank, genset, photovoltaic array, and grid power.

11. The apparatus as recited in claim 1, further comprising a rectifier coupled to said power generator for providing the generated power as a direct current.

12. The apparatus as recited in claim 1, wherein the renewable energy source is a solar energy source, and wherein said power generator is a photovoltaic generator.

13. The apparatus as recited in claim 1, further comprising an inverter coupled to the output for providing the output voltage as an alternating current.

14. The apparatus as recited in claim 1, wherein said bypass channel comprises a bypass diode.

15. The apparatus as recited in claim 1, wherein at least one component of the apparatus is switched off when most of the generated power flows from the output of said power generator to the output of the apparatus via said bypass power flow channel thereby increasing the efficiency of the apparatus.

16. The apparatus as recited in claim 15, further comprising a boost chopper.

17. The apparatus as recited in claim 16, wherein the boost chopper one of the at least one component of the apparatus which is switched off.

* * * * *